United States Patent
Horii et al.

(10) Patent No.: US 10,241,235 B2
(45) Date of Patent: Mar. 26, 2019

(54) OPTICAL LAYERED OBJECT, POLARIZER OBTAINED USING SAME, AND IMAGE DISPLAY DEVICE

(71) Applicant: DAI NIPPON PRINTING CO., LTD., Tokyo (JP)

(72) Inventors: Atsushi Horii, Okayama (JP); Tomoyuki Horio, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 202 days.

(21) Appl. No.: 14/654,751

(22) PCT Filed: Dec. 9, 2013

(86) PCT No.: PCT/JP2013/082991
§ 371 (c)(1),
(2) Date: Jun. 22, 2015

(87) PCT Pub. No.: WO2014/103686
PCT Pub. Date: Jul. 3, 2014

(65) Prior Publication Data
US 2015/0355385 A1    Dec. 10, 2015

(30) Foreign Application Priority Data
Dec. 25, 2012 (JP) ................. 2012-281656

(51) Int. Cl.
*G02B 1/14* (2015.01)
*G02B 5/30* (2006.01)
(Continued)

(52) U.S. Cl.
CPC .................. *G02B 1/14* (2015.01); *B32B 3/30* (2013.01); *B32B 27/08* (2013.01); *B32B 27/308* (2013.01);
(Continued)

(58) Field of Classification Search
CPC .......... G02F 1/13338; G02F 1/133528; Y10T 428/24355; G02B 1/14; G02B 5/3303;
(Continued)

(56) References Cited

U.S. PATENT DOCUMENTS

2010/0028602 A1* 2/2010 Naritomi ........... B29C 45/14311
428/147
2010/0177398 A1  7/2010 Watanabe et al.
(Continued)

FOREIGN PATENT DOCUMENTS

JP        8-197670       8/1996
JP        2002120002 A   4/2002
(Continued)

OTHER PUBLICATIONS

English translation of JP2010-201641 A. accessed Jan. 17, 2017.*
International Search Report of PCT/JP2013/082991 dated Jan. 14, 2014 and English language translation, 2 pages total.

*Primary Examiner* — Nancy R Johnson
(74) *Attorney, Agent, or Firm* — Hamre, Schumann, Mueller & Larson, P.C.

(57) ABSTRACT

Provided are an optical laminate including a resin layer on an acrylic base material in which the generation of an interference pattern is suppressed and the adhesiveness between the acrylic base material and the resin layer improves and a method for efficiently manufacturing the optical laminate. In the optical laminate including the resin layer on one surface of the acrylic base material, in a cross-section of the optical laminate in a thickness direction, an interface between the acrylic base material and the resin layer exhibits a ridge having crests and troughs and a length of the ridge corresponding to a standard length of 30 μm set in a direction perpendicular to the thickness direction of the optical laminate is in a range of 31 μm to 45 μm.

20 Claims, 8 Drawing Sheets

(51) Int. Cl.
  *G02F 1/1333* (2006.01)
  *G02F 1/1335* (2006.01)
  *G02B 1/16* (2015.01)
  *G02B 1/18* (2015.01)
  *G02B 1/10* (2015.01)
  *B32B 27/08* (2006.01)
  *B32B 27/30* (2006.01)
  *B32B 3/30* (2006.01)

(52) U.S. Cl.
  CPC .............. *G02B 1/10* (2013.01); *G02B 1/105* (2013.01); *G02B 1/16* (2015.01); *G02B 1/18* (2015.01); *G02B 5/3033* (2013.01); *G02F 1/13338* (2013.01); *G02F 1/133528* (2013.01); *B32B 2255/10* (2013.01); *B32B 2307/306* (2013.01); *B32B 2307/42* (2013.01); *B32B 2457/20* (2013.01); *Y10T 428/24355* (2015.01)

(58) Field of Classification Search
  CPC ......... B32B 27/08; B32B 27/308; B32B 3/30; B32B 2457/20; B32B 2307/42; B32B 2255/10; B32B 2307/306
  See application file for complete search history.

(56) References Cited

U.S. PATENT DOCUMENTS

2014/0044891 A1* 2/2014 Shibata .................... G02B 1/04
  428/1.31
2014/0220306 A1* 8/2014 Uchida ............... B29C 37/0053
  428/172

FOREIGN PATENT DOCUMENTS

| | | | | |
|---|---|---|---|---|
| JP | 2002210865 A | 7/2002 | | |
| JP | 2010-181862 | 8/2010 | | |
| JP | 2010201641 A | * 9/2010 | | |
| JP | 2011-081359 | 4/2011 | | |
| JP | WO 2013035839 A1 | * 3/2013 | ......... | B29C 37/0053 |
| WO | 2011/055624 | 5/2011 | | |
| WO | WO-2012144510 A1 | * 10/2012 | ............... | G02B 1/04 |

* cited by examiner

OPTICAL LAYERED OBJECT, POLARIZER OBTAINED USING SAME, AND IMAGE DISPLAY DEVICE

TECHNICAL FIELD

The present invention relates to an optical laminate, a polarization plate using the same, and an image display apparatus.

BACKGROUND ART

As image display apparatuses, LCDs, touch panel-equipped LCDs, ELs, electronic paper, and the like have been rapidly distributed in recent years in place of CRT displays of the related art due to their characteristics of power saving, lightweight, large thickness, and the like.

For optical laminates used on the surfaces or in the inside of the image display apparatuses, generally, there is a demand for imparting hardness so as to prevent the optical laminates from being scratched while being handled and thus it is common to impart hardness by providing a hard coat layer or the like onto a light-permeable base material. For example, in LCDs, it is common to impart hardness to image display surfaces by using a hard coat film in which a polarization element is disposed on a side facing the image display surface of a liquid crystal cell and a hard coat layer is provided on a light-permeable base material as a polarization plate protective film.

In the related art, as the light-permeable base material for the hard coat film, films made of a cellulose ester represented by triacetyl cellulose have been used. This has been based on an advantage that cellulose esters have excellent transparency and optical isotropy and rarely have a phase difference in the plane (have a low retardation value) and thus rarely change the vibration direction of straight incident polarized light and have a little influence on the display quality of liquid crystal displays or an advantage that cellulose esters have appropriate water permeability and thus are capable of drying any moisture remaining in a polarizer when a polarization plate formed using an optical laminate is manufactured through the optical laminate.

However, cellulose ester films are materials having disadvantages in terms of cost, have insufficient humid resistance and heat resistance, and have a defect of degrading polarization plate functions such as a polarization function or hue when a hard coat film including the cellulose ester film as a base material is used as the polarization plate protective film in a high-temperature and humidity environment.

Due to the above-described problems of the cellulose ester films, the use of transparent plastic base materials including an acrylic resin as a main component which have excellent transparency, heat resistance, and mechanical strength and can be easily procured from the market at a lower price compared with the cellulose ester films has been proposed.

However, in optical laminates in which hard coat layers are formed on either or both surfaces of a base material including an acrylic resin as a main component, there has been a problem of poor adhesiveness between the acrylic base material and the hard coat layer. In addition, a refractive index difference is caused between the acrylic base material and the hard coat layer and, in a case in which a polarization plate or the like is formed using the optical laminate, there has been another problem in that an interference pattern is generated and thus the appearance becomes poor.

With respect to the above-described problems, for example, PTL 1 discloses that the adhesiveness between a base material film and a hard coat layer is improved by applying paint called an anchoring agent or a primer to a base material film in addition to a physical treatment such as a corona discharge treatment or an oxidization treatment and then forming a hard coat layer. In addition, for example, PLT 2 discloses a method in which protrusions and recesses are formed on the interface between a base material film and a hard coat layer.

However, in the above-described methods, the number of steps necessary to manufacture the hard coat film increases and it is necessary to carry out special treatments and thus the productivity deteriorates.

CITATION LIST

Patent Literature

[PTL 1] JP-A-2011-81359
[PTL 2] JP-A-8-197670

SUMMARY OF INVENTION

Technical Problem

In addition, regarding the acrylic base material, compared with cellulose ester films or polyethylene-based films that have been frequently used in the related art, all solvents that can be generally used have a power to swell the base material and, furthermore, the base material is likely to be strongly affected by swelling depending on solvents and thus there is a problem of the base material being fractured or the like while being processed, thereby techniques known for transparent plastic base materials of the related art also have a problem in that the techniques cannot be used for the acrylic base material as it is.

An object of the present invention is to provide an optical laminate including a resin layer on an acrylic base material which can be obtained with a relatively small number of manufacturing steps, can be processed without the fracture of the acrylic base material, suppresses the generation of an interference pattern, and has excellent adhesiveness between the acrylic base material and the resin layer.

Solution to Problem

As a result of the repetition of intensive studies to solve the above-described problems, the present inventors found that, in an optical laminator including a resin layer on one surface of an acrylic base material, the above-described problems can be solved by providing protrusions and recesses having a specific shape to an interface between the acrylic base material and the resin layer. The present invention has been completed on the basis of the above-described finding.

That is, the present invention provides the following inventions.

[1] An optical laminate including a resin layer on one surface of an acrylic base material, in which, in a cross-section of the optical laminate in a thickness direction, an interface between the acrylic base material and the resin layer exhibits a ridge having crests and troughs and a length of the ridge corresponding to a standard length of 30 µm set in a direction perpendicular to the thickness direction of the optical laminate is in a range of 31 µm to 45 µm.

[2] The optical laminate according to [1], in which, in the cross-section of the optical laminate in the thickness direction, in the standard length of 30 μm set in the direction perpendicular to the thickness direction of the optical laminate, an average depth of three deepest troughs selected from plural troughs in the interface is considered as a standard depth, subsequently, an average height of three highest crests selected from plural crests in the interface is considered as a standard height, and a vertical difference between the standard height and the standard depth is in a range of 0.3 μm to 3.5 μm.

[3] The optical laminate according to [1] or [2], in which an average inclination angle θa of the ridge is in a range of 15° to 48°.

[4] The optical laminate according to any one of [1] to [3], in which an average interval Sm of protrusions and recesses shown by the ridge is in a range of 0.5 μm to 7 μm.

[5] A polarization plate formed by laminating the optical laminate according to any one of [1] to [4] on at least one surface of a polarization film.

[6] An image display apparatus including the optical laminate according to any one of [1] to [4] and/or the polarization plate according to [5].

Advantageous Effects of Invention

The optical laminate of the present invention includes a resin layer on an acrylic base material, can be obtained with a relatively small number of manufacturing steps, suppresses the generation of an interference pattern, and has excellent adhesiveness between the acrylic base material and the resin layer.

DESCRIPTION OF EMBODIMENTS

An optical laminate according to the present invention is an optical laminate including a resin layer on one surface of an acrylic base material, in which, in a cross-section of the optical laminate in the thickness direction, an interface between the acrylic base material and the resin layer exhibits a ridge having crests and troughs and the length of the ridge corresponding to a standard length of 30 μm set in a direction perpendicular to the thickness direction of the optical laminate is in a range of 31 μm to 45 μm.

Figure 1:
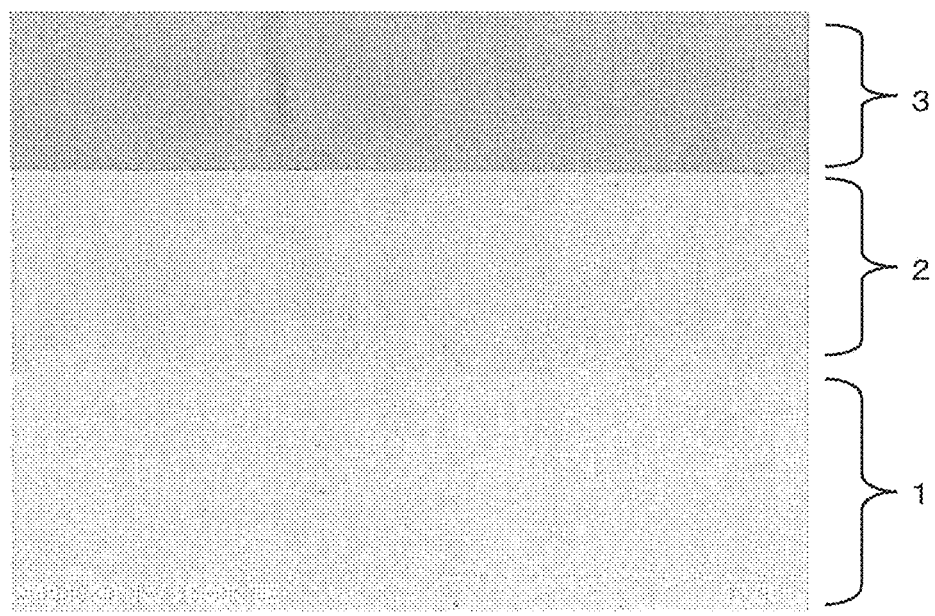
FIG. 1 is a scanning transmission electron microscope photograph (STEM) illustrating a cross-section of an aspect of an optical laminate of the present invention.
Figure 2:
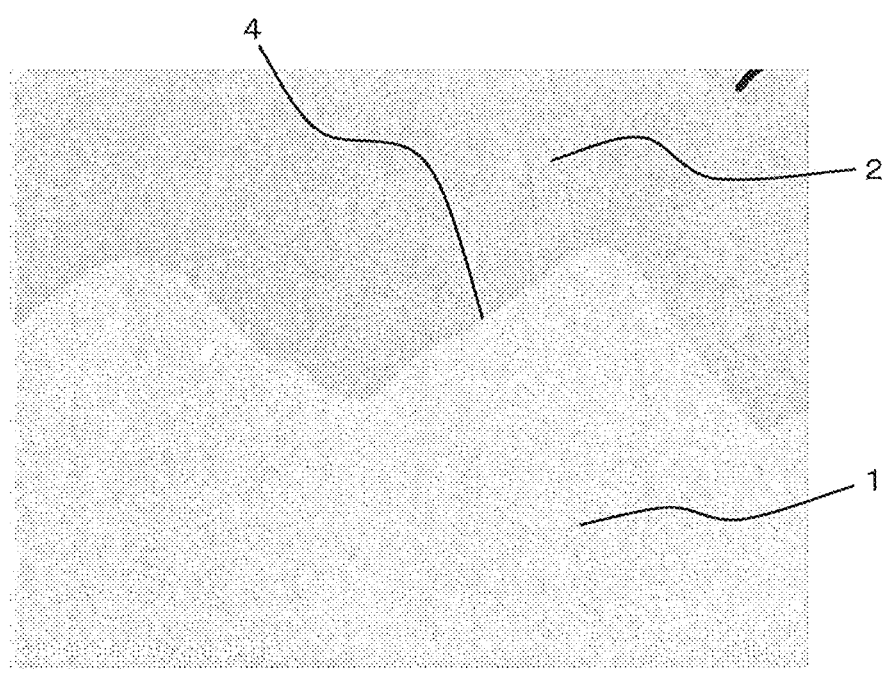
FIG. 2 is a scanning transmission electron microscope photograph (STEM) illustrating an enlarged interface between an acrylic base material and a resin layer in a cross-section of an aspect of the optical laminate of the present invention.
Figure 3:
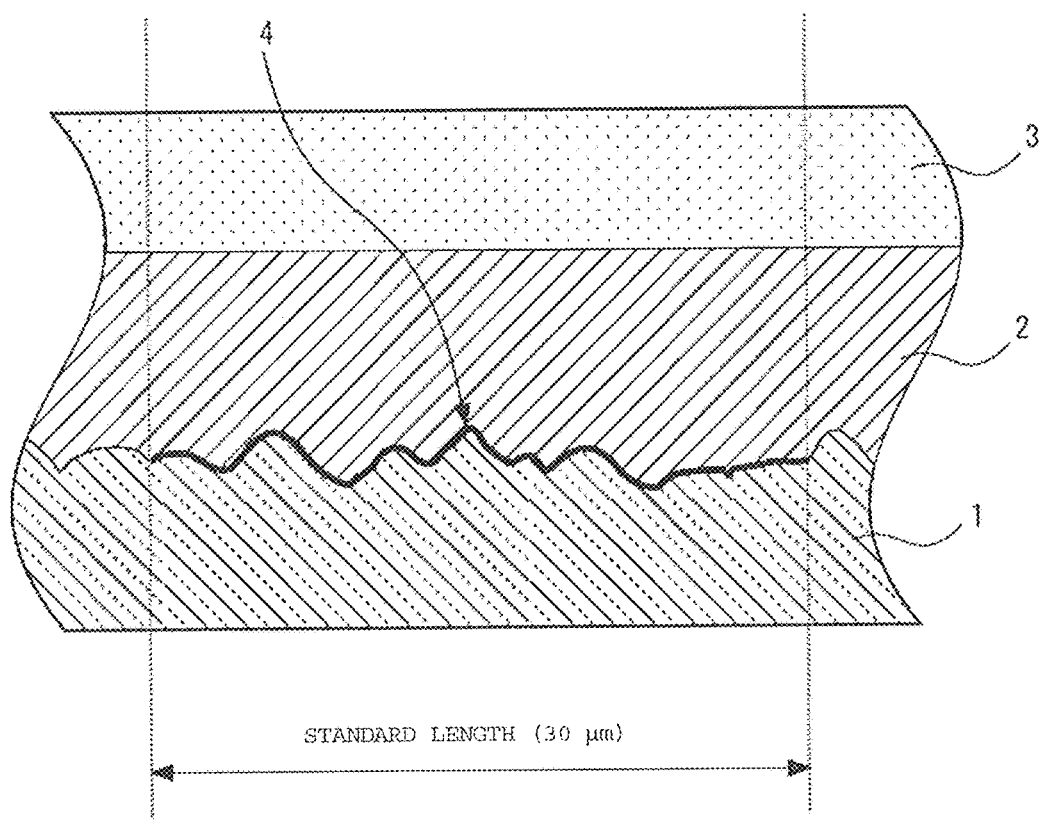
FIG. 3 is a schematic view illustrating a cross-section of an aspect of the optical laminate of the present invention.

The optical laminate of the present invention includes a resin layer on an acrylic base material and, as illustrated in FIGS. 1 and 2, an interface between the acrylic base material and the resin layer (hereinafter, in some cases, abbreviated as an acrylic base material-resin layer interface) has protrusions and recesses.

In addition, the length of the ridge is preferably in a range of 31 μm to 45 μm and more preferably in a range of 32 μm to 42 μm. When the length of the ridge is less than 31 μm, the protrusion and recess shape of the acrylic base material-resin layer interface becomes insufficient and the proportion of flat portions increases and thus adhesiveness at the acrylic base material-resin layer interface deteriorates or an interference pattern is likely to be generated. On the other hand, when the length of the ridge exceeds 45 μm, haze in the optical laminate increases.

Specifically, the length of the ridge is measured as described below.

(Method for Measuring Length of Ridge Corresponding to Standard Length of 30 μm)

Here, the length of the ridge corresponding to the standard length of 30 μm can be measured through, for example, the image analysis of a cross-section obtained using image analysis software (IMAGE-PRO, manufactured by Media Cybernetics, Inc.). Specifically, an image on which cross-section observation is carried out using an electron microscope or the like is used, the standard length is set in a straight line between the resin layer and base material film edge portions in the image using the image analysis software, and the length of the interface corresponding to the standard length is measured using the image analysis software. More specifically, image analysis software Image-Pro Plus, Sharp Stack Version 6.2 is used, operation procedure are carried out in the following order, calibration wizards for measurement, calibration, and spaces, calibration of an active image and selection for microns as a unit, furthermore, definition lines are drawn in accordance with the scales of the image, and calibration is carried out. After the calibration, the standard length is set between two points at both ends of the interface by distance measurement. Next, a trace line is produced by manual measurement (threshold value=3, smoothing=0, speed=3, noise=5, automatic), a curve is automatically measured by matching the standard to the ends, and the actual measurement value is read and used as the length of the interface.

In addition, in the optical laminate of the present invention, in the cross-section of the optical laminate in the thickness direction, in the standard length of 30 μm set in the direction perpendicular to the thickness direction of the optical laminate, the average depth of three deepest troughs selected from plural troughs in the interface is considered as the standard depth, subsequently, the average height of three highest crests selected from plural crests in the interface is considered as the standard height, and the vertical difference between the standard height and the standard depth is preferably in a range of 0.3 µm to 3.5 µm, more preferably in a range of 0.7 µm to 3.0 µm, and still more preferably in a range of 1.0 µm to 2.5 µm. When the vertical difference is 3.5 µm or less, haze does not easily occur and, when the vertical difference is 0.3 µm or more, an interference pattern is not easily generated and adhesiveness between the acrylic base material-resin layer interfaces improves.

The vertical difference between the standard height and the standard depth is specifically measured as described below.

(Method for Measuring Vertical Difference Between Standard Height and Standard Depth)

Figure 4:
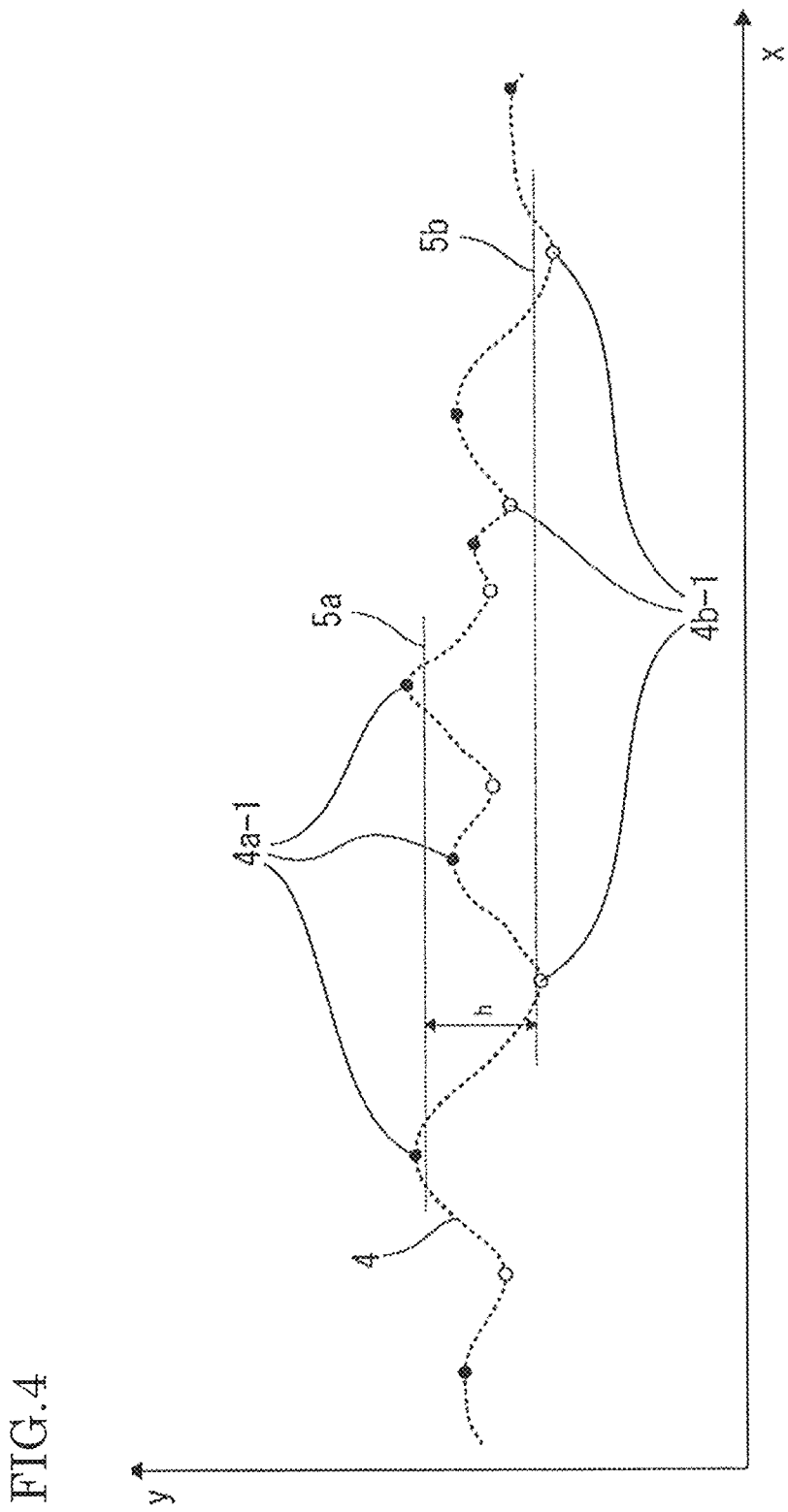
FIG. 4 is a schematic view illustrating a ridge of interface between an acrylic base material and a resin layer and a vertical difference between a standard height and a standard depth in the optical laminate of the present invention.

As illustrated in FIG. 4, in the cross-section of the optical laminate in the thickness direction, the acrylic base material-resin layer interface exhibits a ridge having crests and troughs, in an xy plane having an y axis in the thickness direction of the optical laminate (here, the positive orientation is toward the resin layer) and an x axis in a direction perpendicular to the y axis, the standard length L of 30 µm is set in the x axis direction, 3 smallest points (4b-1) in terms of the y coordination are selected from plural infinitesimal points 4b of the ridge in the standard length L, the average y coordinate thereof is considered as the standard depth 5b, on the other hand, 3 largest points (4a-1) in terms of the y coordination are selected from plural maximal points 4a of the ridge in the standard length L, the average y coordinate thereof is considered as the standard height 5a, and the difference (absolute value) between the standard depth 5b and the standard height 5a serves as the vertical difference between the standard depth 5b and the standard height 5a.

In the optical laminate of the present invention, the average inclination angle θa of the ridge is preferably in a range of 15° to 48°, more preferably in a range of 20° to 48°, and still more preferably in a range of 25° to 45°. When the average inclination angle θa is 48° or less, haze does not easily occur and, when the average inclination angle is 15° or more, an interference pattern is not easily generated and adhesiveness between the acrylic base material-resin layer interfaces improves.

The average inclination angle θa is specifically measured as described below.

(Method for Measuring Average Inclination Angle θa)

Figure 5:
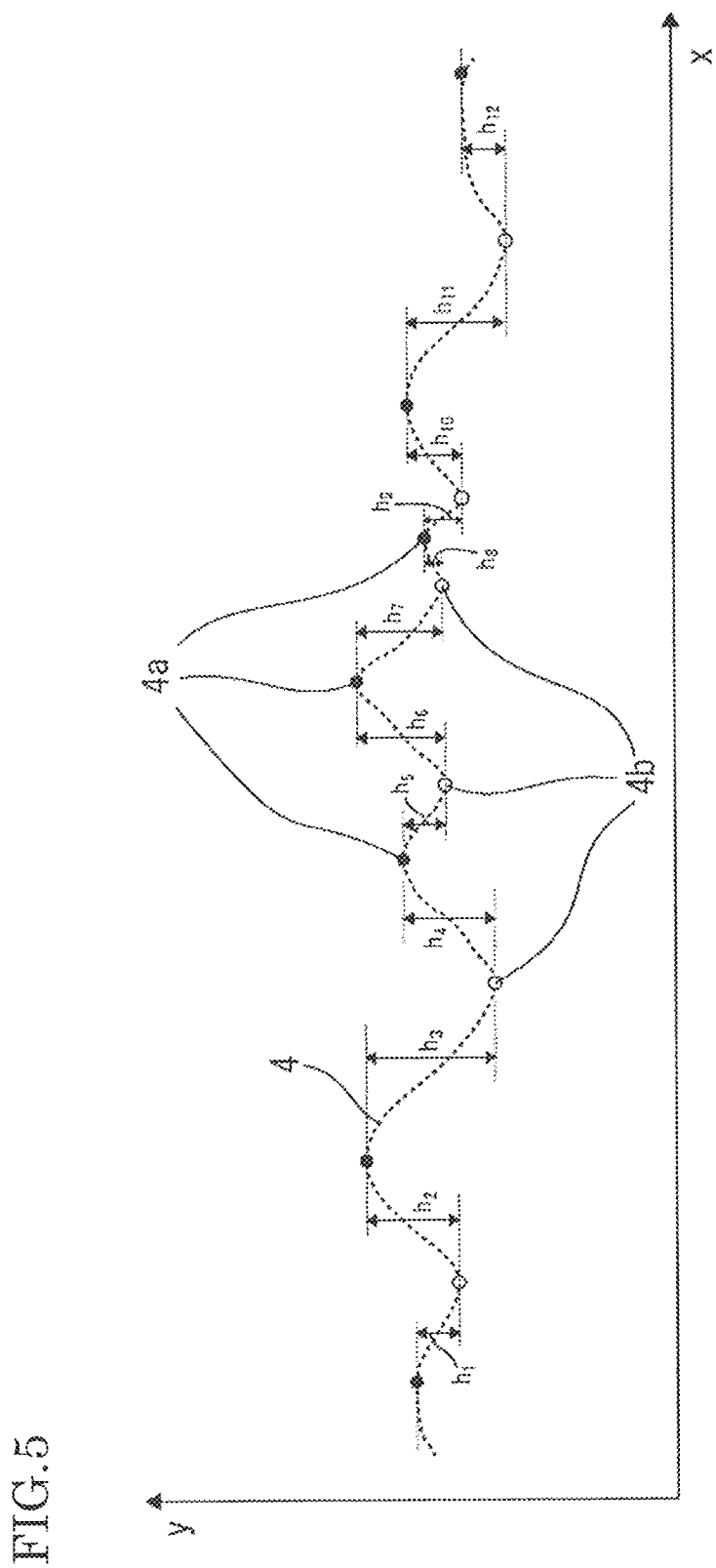
FIG. 5 is a schematic view illustrating the ridge of interface between an acrylic base material and a resin layer and vertical differences between adjacent external points.
Figure 6:
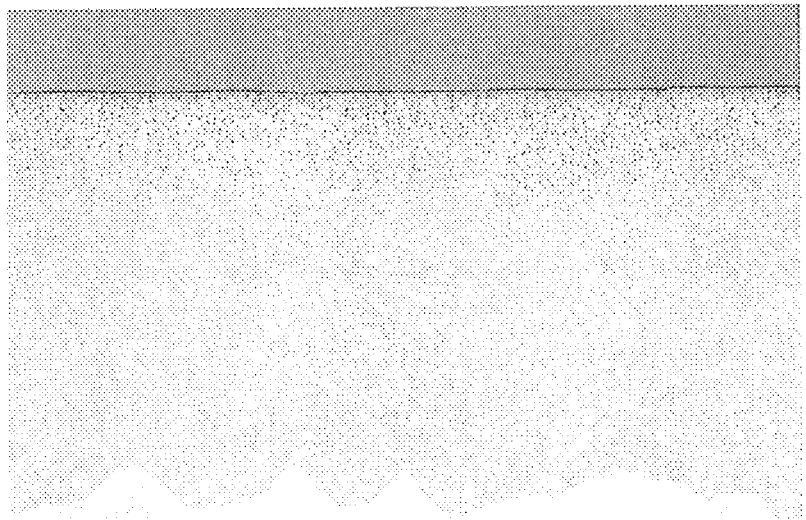
FIG. 6 is a scanning transmission electron microscope photograph (STEM) illustrating a cross-section of the optical laminate of the present invention obtained in Example 10.

As illustrated in FIG. 5, in the cross-section of the optical laminate in the thickness direction, the acrylic base material-resin layer interface exhibits a ridge having crests and troughs, in an xy plane having an y axis in the thickness direction of the optical laminate (here, the positive orientation is toward the resin layer) and an x axis in a direction perpendicular to the y axis, the standard length L of 30 µm is set in the x axis direction, extremal points (maximal points 4a and infinitesimal points 4b) of the ridge in the standard length L are determined, and, when the sum of the vertical differences ($h_1$ to $h_{12}$, absolute values) between all of the adjacent extremal points is considered as the total vertical difference ΣH, the value expressed by $\tan^{-1}$ (total vertical difference ΣH/standard length L) serves as the average inclination angle θa.

Furthermore, in the optical laminate of the present invention, the average interval Sm of the protrusions and the recesses shown by the ridge is in a range of 0.5 µm to 7 µm, more preferably in a range of 1 µm to 6 µm, and still more preferably in a range of 2 µm to 5 When the average interval S is 0.5 µm or more, haze does not easily occur and, when the average interval S is 7 µm or less, an interference pattern is not easily generated and adhesiveness between the acrylic base material-resin layer interfaces improves.

Furthermore, the average interval Sm can be measured according to JIS B0601 (1994).

Since the optical laminate of the present invention includes an acrylic resin in the base material, compared with optical laminates including a base material made of triacetyl cellulose (TAC), humid and heat resistance and levelling properties are excellent and the generation of wrinkles can be preferably prevented. In the present specification, the "acrylic resin" refers to an acryl-based resin and/or a methacryl-based resin.

<Acrylic Base Material>

The acrylic resin included in the acrylic base material is not particularly limited but is preferably, for example, a resin formed by polymerizing an alkyl (meth)acrylate or a combination of two or more alkyl (meth)acrylates and, more specifically, is preferably a resin obtained using methyl (meth)acrylate.

As the acrylic resin included in the acrylic base material, an acrylic resin having a ring structure such as an acrylic resin having a lactone ring structure or an acrylic resin having an imide ring structure may be used.

Specific examples of the acrylic resin having a lactone ring structure include acrylic resins described in, for example, JP-A-2000-230016, JP2001-151814, JP2002-120326, JP2002-254544, JP2005-146084, and the like.

As the acrylic resin having a lactone ring structure, the acrylic base material preferably includes a lactone ring structure expressed by Formula (1) illustrated below.

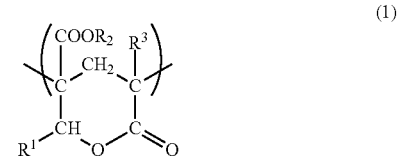

(1)

In Formula (1), each of $R^1$, $R^2$, and $R^3$ independently represents a hydrogen atom or an organic group having 1 to 20 carbon atoms. Meanwhile, the organic group may include an oxygen atom.

The content ratio of the lactone ring structure expressed by Formula (1) in the structure of the acrylic resin having a lactone ring structure is preferably in a range of 5% by mass to 90% by mass, more preferably in a range of 10% by mass to 70% by mass, still more preferably in a range of 10% by mass to 60% by mass, and most preferably in a range of 10% by mass to 50% by mass. When the content ratio of the lactone ring structure expressed by Formula (1) is 5% by mass or more, heat resistance, solvent resistance, and surface hardness improve and, when the content ratio is 90% by mass or less, molding processability improves.

The weight-average molecular weight of the acrylic resin included in the lactone ring structure is preferably in a range of 1000 to 2 million, more preferably in a range of 5000 to 1 million, still more preferably in a range of 10000 to 500000, and most preferably in a range of 50000 to 500000. The weight-average molecular weight of the acrylic resin included in the lactone ring structure is preferably in the above-described range from the viewpoint of the above-described effects of the preset invention.

In addition, examples of the acrylic resin having an imide ring structure include acrylic resins having a glutarimide structure or an N-substituted maleimide structure.

As the acrylic resin having a glutarimide structure, the acrylic base material preferably includes a glutarimide structure expressed by Formula (2) illustrated below.

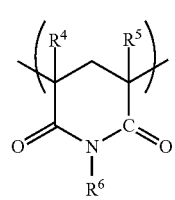

(2)

In Formula (2), each of $R^4$ and $R^5$ independently represents a hydrogen atom or a methyl group and $R^6$ represents a hydrogen atom, a straight alkyl group having to 6 carbon atoms, a cyclopentyl group, a cyclohexyl group, or a phenyl group.

Meanwhile, the glutarimide structure can be formed by, for example, imidizing a (meth)acrylic acid ester polymer using an imidizing agent such as methylamine. Here, the "(meth)acrylic" indicates "acrylic" and "methacrylic".

As the acrylic resin having an N-substituted maleimide structure, the acrylic base material preferably includes an N-substituted maleimide structure expressed by Formula (3) illustrated below.

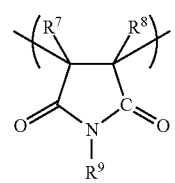

(3)

In Formula (3), each of $R^7$ and $R^9$ independently represents a hydrogen atom or a methyl group and $R^9$ represents a hydrogen atom, a straight alkyl group having 1 to 6 carbon atoms, a cyclopentyl group, a cyclohexyl group, or a phenyl group.

Meanwhile, the acrylic resin having the above-described N-substituted maleimide structure in the main chain can be formed by, for example, copolymerizing N-substituted maleimide and (meth)acrylic acid ester.

In addition, the glass transition temperature (Tg) of the acrylic resin is preferably in a range of 100° C. to 140° C., more preferably in a range of 105° C. to 135° C., and still more preferably in a range of 110° C. to 130° C. When the glass transition temperature (Tg) of the acrylic resin is 110° C. or higher, the acrylic resin is likely to be damaged by a solvent included in a composition for forming the resin layer when the resin layer is formed and, on the other hand, when the glass transition temperature is 150° C. or lower, protrusions and recesses are likely to be formed in the interface with the resin layer.

The acrylic base material may include resins other than the acrylic resin and the fraction of the acrylic resin in the acrylic base material is preferably 80% by mass or more and more preferably 90% by mass or more.

The thickness of the acrylic base material is preferably in a range of 20 μm to 300 μm and, more preferably, the upper limit is 200 μm and the lower limit is 30 μm. When the thickness of the acrylic base material is 20 μm or more, wrinkles are not easily generated in the optical laminate of the present invention and, on the other hand, when the thickness is 300 μm or less, the optical laminate of the present invention becomes thin and is excellent in terms of optical characteristics such as light permeability.

The acrylic base material is preferably a stretched acrylic base material. When a stretched acrylic base material is used, it is possible to improve the strength or dimensional stability of the base material.

The acrylic base material can be manufactured by, for example, ordinarily melt-extruding a pellet (chip) made of an acrylic resin having an adjusted humidity, then, cooling and vertically stretching the pellet, and then horizontally stretching the pellet.

In the melt-extrusion step, a monoaxial, biaxial or more-axial screw can be used and the rotation direction and rotation speed of the screw and the melting temperature can be arbitrarily set.

The stretching is preferably carried out so that a desired thickness is obtained after the stretching. In addition, the stretching ratio is not limited but is preferably in a range of 1.2 times to 4.5 times. The temperature and humidity during the stretching are arbitrarily determined. The stretching method may be an ordinary method.

The acrylic base material may include acrylic rubber particles, an antioxidant, an ultraviolet absorber, a plasticizer, and the like.

In addition, in the present invention, a surface treatment such as a saponification treatment, a glow discharge treatment, a corona discharge treatment, a plasma treatment, an ultraviolet (UV) treatment, or a flame treatment may be carried out on the acrylic base material within the scope of the gist of the present invention.

<Resin Layer>

The resin layer is not particularly limited but is preferably, for example, a cured substance of an ionizing radiation-curable resin composition A including monofunctional to trifunctional (meth)acrylate, particularly a difunctional (meth)acrylate. In a case in which a monofunctional or trifunctional (meth)acrylate is used, the joint use with a difunctional (meth)acrylate is preferred.

Specific examples of the difunctional (meth)acrylate include isocyanurate di(meth)acrylates, polyalkylene glycol di(meth)acrylate, 1,6-hexanediol di(meth)acrylate, 1,9-nonanediol di(meth)acrylate, and the like. Especially, among difunctional (meth)acrylates, from the viewpoint of the suppression of the base material being fractured by the ionizing radiation-curable resin composition A and the easy control of the above-described surface protrusions and recesses, particularly, a polyalkylene glycol di(meth)acrylate is most preferred.

In addition, examples of the polyalkylene glycol di(meth)acrylate include polyethylene glycol di(meth)acrylates such as diethylene glycol di(meth)acrylate, triethylene glycol (meth)acrylate, and tetraethylene glycol di(meth)acrylate, polypropylene glycol di(meth)acrylates such as dipropylene glycol di(meth)acrylate, and polybutylene glycol di(meth)acrylates such as dibutylene glycol di(meth)acrylate, tributylene glycol di(meth)acrylate, and tetrabutylene glycol di(meth)acrylate.

Here, in the present specification, the ionizing radiation-curable resin composition refers to an electron radiation-curable resin composition and/or an ultraviolet-curable resin composition.

Meanwhile, in the present specification, the "(meth)acrylates" refer to methacrylates and acrylates.

Specific examples of the monofunctional (meth)acrylate include methyl (meth)acrylates, ethyl (meth)acrylates, butyl (meth)acrylates, hexyl (meth)acrylates, cyclohexyl (meth) acrylates, 2-ethylhexyl (meth)acrylates, phenyl (meth)acrylates, alkylene glycol mono(meth)acrylates (ethylene glycol mono(meth)acrylate, propylene glycol mono(meth)acrylate, butylene glycol mono(meth)acrylate, and the like), and polyalkylene glycol mono(meth)acrylates (polyethylene glycol mono(meth)acrylate, polypropylene glycol mono(meth)acrylate, polybutylene glycol mono(meth)acrylate, and the like) and alkylene glycol mono(meth)acrylates are particularly preferred.

Specific examples of the trifunctional (meth)acrylate include isocyanuric acid triacrylates, polyalkylene glycol tri(meth)acrylate, trimethylol propane tri(meth)acrylate, pentaerythritol tri(meth)acrylate, and the like.

Furthermore, polyethylene oxide (PO)-denatured products and ethylene oxide (EO)-denatured products of each of the monofunctional, difunctional, and trifunctional compounds are also preferred.

In a case in which the ionizing radiation-curable resin composition A includes the difunctional (meth)acrylate, the monofunctional (meth)acrylate, or the trifunctional (meth) acrylate, the mass ratio of the difunctional (meth)acrylate is preferably greater than the total mass ratio of the monofunctional (meth)acrylate and the trifunctional (meth)acrylate.

The ionizing radiation-curable resin composition A may further include a photopolymerizable monomer, a photopolymerizable oligomer, a photopolymerizable polymer, and the like in addition to the monofunctional to trifunctional (meth)acrylate and, in a case in which the ionizing radiation-curable resin composition is an ultraviolet-curable resin composition, the ionizing radiation-curable resin composition includes an initiator.

(Difunctional (Meth)Acrylate)

The molecular weight of the difunctional (meth)acrylate is preferably in a range of 180 to 1000, more preferably in a range of 200 to 750, and particularly preferably in a range of 220 to 450. When the molecular weight of the difunctional (meth)acrylate is in the above-described range, an optical laminate which satisfies the length of the ridge corresponding to the standard length of 30 μm, the vertical difference between the standard height and the standard depth, and the average inclination angle θa can be easily obtained and adhesiveness or interference pattern-preventing properties are excellent.

The amount of the difunctional (meth)acrylate blended in the ionizing radiation-curable resin composition A is preferably in a range of 50% by mass to 100% by mass and particularly preferably in a range of 70% by mass to 100% by mass in terms of the amount of the solid content. In a case in which the difunctional (meth)acrylate is jointly used with the monofunctional (meth)acrylate and/or the trifunctional (meth)acrylate, the amount of the monofunctional (meth) acrylate and/or the trifunctional (meth)acrylate blended in the ionizing radiation-curable resin composition A is preferably set to the remnant of the amount of the difunctional (meth)acrylate blended.

Figure 7:
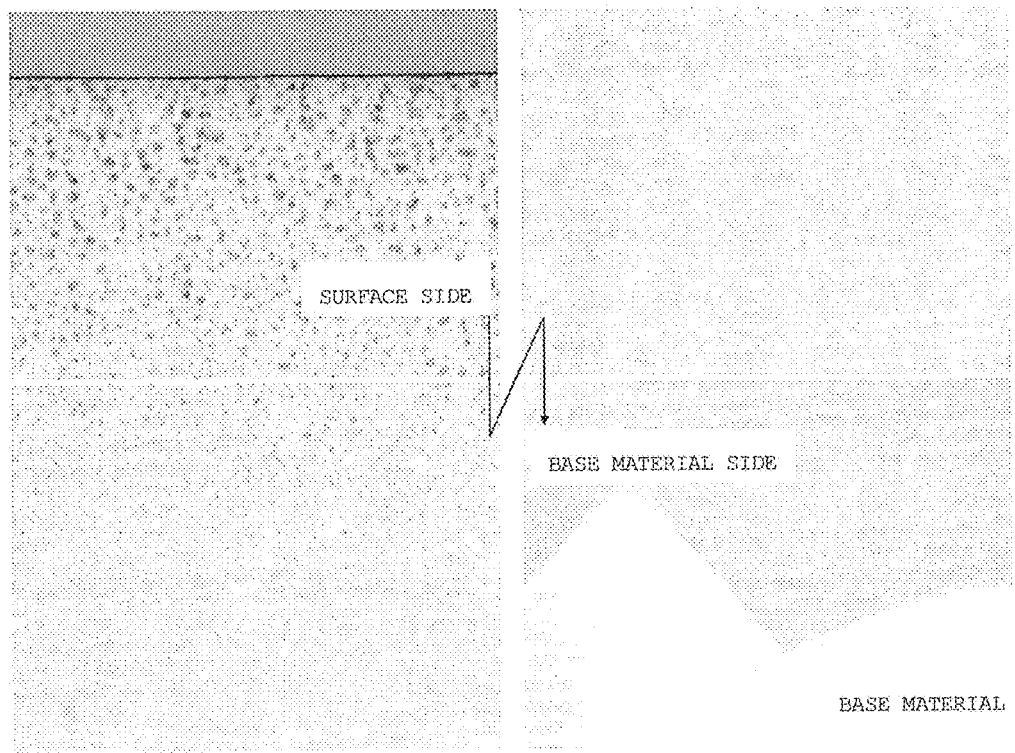
FIG. 7 is a scanning transmission electron microscope photograph (STEM) illustrating an enlarged portion from an interface between a hard coat layer and a resin layer to an interface between an acrylic base material and a resin layer on a cross-section of the optical laminate of the present invention obtained in Example 10.
Figure 8:
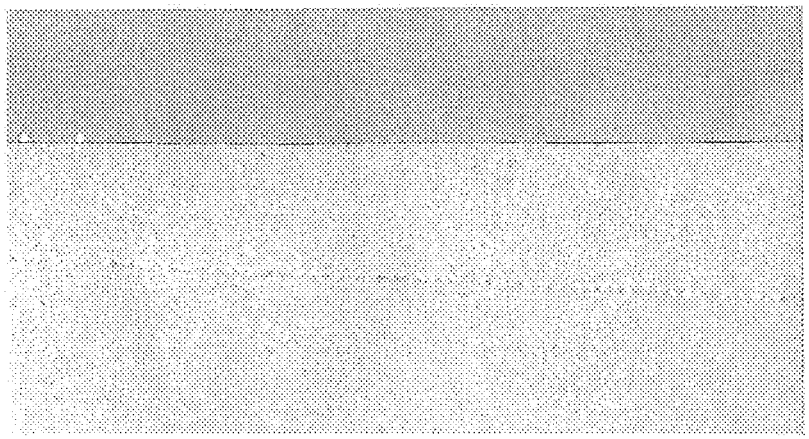
FIG. 8 is a scanning transmission electron microscope photograph (STEM) illustrating a cross-section of an optical laminate obtained in Comparative Example 8.
Figure 9:
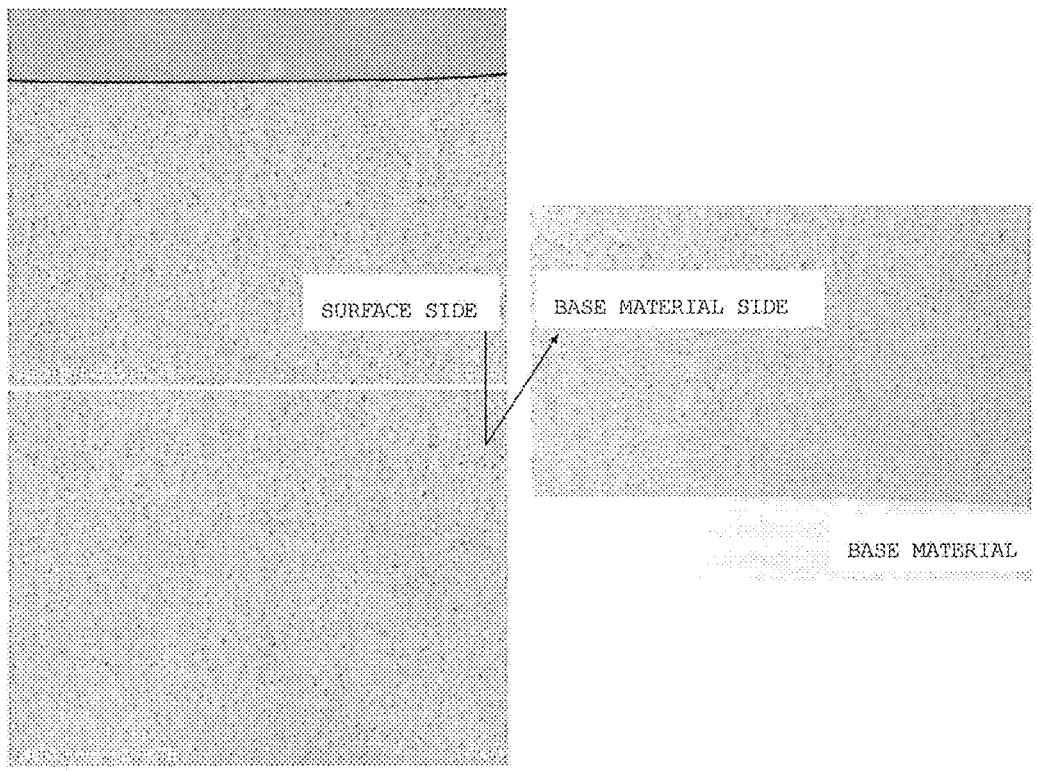
FIG. 9 is a scanning transmission electron microscope photograph (STEM) illustrating an enlarged portion from an interface between a hard coat layer and a resin layer to an interface between an acrylic base material and a resin layer on a cross-section of the optical laminate of the present invention obtained in Comparative Example 8.

Meanwhile, in a case in which other functional components such as a refractive index-adjusting material or an antistatic material are added to the resin layer, as illustrated in FIG. 7, the functional components do not exist in the lower portion of the resin layer and eccentrically and densely exist in the upper portion and thus it is presumed that a solvent described below volatilizes and material components of the dissolved acrylic base material flow into the resin layer and thus the protrusions and recesses of the acrylic base material-resin layer interface are formed. Meanwhile, appropriate protrusions and recesses are formed in the interface due to what has been described above, adhesiveness becomes favorable, interference pattern-preventing properties also become favorable, and, furthermore, intended functions (antistatic properties, a high refractive index, a low refractive index, and the like) can be favorably generated, which is preferable.

(Photopolymerizable Polymer)

As the photopolymerizable polymer, a polymer having a (meth)acryloyl group as a functional group is preferred and the number of the functional groups is preferably in a range of 10 to 250, more preferably in a range of 10 to 100, and still more preferably in a range of 10 to 50.

The weight-average molecular weight of the photopolymerizable polymer is preferably in a range of 10,000 to 100,000 and more preferably in a range of 12,000 to 40,000.

The amount of the photopolymerizable polymer blended in the ionizing radiation-curable resin composition A is preferably in a range of 0% by mass to 40% by mass and more preferably in a range of 0% by mass to 30% by mass in terms of the amount of the solid content.

(Photopolymerizable Oligomer)

As the photopolymerizable oligomer, a difunctional or more-functional oligomer is used, an oligomer having a (meth)acryloyl group as the functional group is preferred, and the number of the functional groups is preferably in a range of 2 to 30, more preferably in a range of 2 to 20, and still more preferably in a range of 3 to 15.

The weight-average molecular weight of the photopolymerizable oligomer is preferably in a range of 1,000 to 10,000 and more preferably in a range of 1,500 to 10,000.

The amount of the photopolymerizable oligomer blended in the ionizing radiation-curable resin composition A is preferably in a range of 0% by mass to 40% by mass and more preferably in a range of 0% by mass to 30% by mass in terms of the amount of the solid content.

(Photopolymerizable Monomer Other than Monofunctional to Trifunctional (Meth)Acrylates)

Examples of the photopolymerizable monomer include monomers having one or more unsaturated bonds such as compounds having a (meth)acryloyl group. Examples of the monofunctional monomer having one unsaturated bond include styrene, methylstyrene, N-vinylpyrrolidone, and the like. Examples of the polyfunctional monomer having two or more unsaturated bonds include pentaerythritol tetra (meth)acrylate, dipentaerythritol hexa(meth)acrylate, dipentaerythritol penta(meth)acrylate, and the like, and polyfunctional compounds obtained by denaturing the above-described monomer using ethylene oxide (EO) or the like.

When the monofunctional monomer is used, the adjustment of the refractive index becomes easy and a resin layer having a higher refractive index can be formed, on the other hand, when the polyfunctional monomer is used, hardness becomes favorable.

The molecular weight of the photopolymerizable monomer is preferably in a range of 200 to 1,000 and more preferably in a range of 250 to 750.

The amount of the photopolymerizable monomer other than the monofunctional to trifunctional (meth)acrylates blended in the ionizing radiation-curable resin composition A is preferably in a range of 0% by mass to 40% by mass and more preferably in a range of 0% by mass to 30% by mass in terms of the amount of the solid content.

The ionizing radiation-curable resin composition A preferably further includes a solvent.

As the solvent, it is preferable to select a solvent that appropriately swells the acrylic base material. However, unlike TAC base materials that have been frequently used in the related art, the acrylic base material swells in almost all kinds of solvents. Therefore, there are cases in which the acrylic base material breaks when the solvent has a strong influence and the degree of swelling is too great and thus, when a solvent described below is selected, it is possible to appropriately swell the acrylic base material, the migration balance between a resin component constituting the base material and a resin component constituting the resin layer becomes appropriate, and it is possible to obtain a preferable ridge in the interface.

Furthermore, as the solvent, it is possible to select and use a solvent depending on the kind and solubility of the resin component being used. The solvent is preferably an alcohol (methanol, ethanol, isopropanol, or 1-butanol), and, for a variety of kinds of solvents other than alcohols, there is a tendency that solvents having a larger number of carbon atoms are favorable and, among them, there is another tendency that solvents having a higher evaporation rate are favorable. Examples thereof include methyl isobutyl ketone from among ketones, toluene from among aromatic hydrocarbons, and propylene glycol monomethyl ethers from among glycols and the solvent may be a solvent mixture thereof.

Particularly, in the present invention, the solvent particularly preferably includes one or more selected from methyl isobutyl ketone, isopropanol, 1-butanol, and propylene glycol monomethyl ethers because the compatibility with the resin and coatability are excellent, the protrusion and recess shape unique to the present application is formed in the acrylic base material-resin layer interface, and, furthermore, a disadvantage of the base material being fractured while being processes is not caused. When the above-described solvent is used, it is possible to appropriately swell the base material without breaking the acrylic base material.

On the contrary, since there are cases in which esters (methyl acetate, ethyl acetate, propyl acetate, butyl acetate, and the like), ketones (acetone, methyl ethyl ketone, cyclohexanone, and diacetone alcohol), cellosolves, ethers (dioxane, tetrahydrofuran, propylene glycol monomethyl ether acetate, and the like), aliphatic hydrocarbons (hexane and the like), aromatic hydrocarbons (xylene), halogenated hydrocarbons (dichloromethane, dichloroethane, and the like), cellosolves (methyl cellosove, ethyl cellosolve, and the like), cellosolve acetates, sulfoxides (dimethyl sulfoxide and the like), amides (dimethyl formamide, dimethyl acetoamide, and the like) excessively swell the acrylic base material, it is preferable not to use these solvents in a case in which tension is applied to the base material.

The content fraction of the solvent in the ionizing radiation-curable resin composition A is not particularly limited and, for example, the content fraction of the above-described preferable solvent is preferably in a range of 30 parts by mass to 300 parts by mass and more preferably in a range of 100 parts by mass to 220 parts by mass with respect to 100 parts by mass of the solid content of the ionizing radiation-curable resin composition A. When the content fraction of the solvent is in the above-described range, an optical laminate which satisfies the length of the ridge corresponding to the standard length of 30 μm, the vertical difference between the standard height and the standard depth, and the average inclination angle θa can be easily obtained. When the content fraction of the solvent is 30 parts by mass or less with respect to 100 parts by mass of the solid content of the ionizing radiation-curable resin composition A, the length of the ridge corresponding to the standard length of 30 m, the vertical difference between the standard height and the standard depth, and the average inclination angle θa become greater and, when the content fraction is 300 parts by mass or less, they becomes smaller.

In the acrylic base material-resin layer interface in the optical laminate of the present invention, the ridge having the crests and the troughs can be effectively obtained by combining the ionizing radiation-curable resin composition A including the difunctional (meth)acrylate such as polyalkylene glycol di(meth)acrylate and the above-described preferable solvent. For example, the acrylic base material is appropriately swollen by the solvent and, accordingly, a difunctional (meth)acrylate or the like having an appropriate molecular weight infiltrates into the acrylic base material. In addition, when the components of the resin layer infiltrate into the acrylic base material, conversely, the material components of the acrylic base material are pushed out toward the resin layer or the solvent volatilizes from the acrylic base material toward an air surface of the resin layer, thereby the material components of the swollen acrylic base material also infiltrate into the resin layer. It is considered that the movement of the respective components from the upper portion to the lower portion and vice versa generates a ridge having appropriate crests and troughs in the interface, adhesiveness becomes favorable, and interference pattern-preventing properties also becomes favorable. The structure or average inclination angel of the ridge can be adjusted by controlling the components of the preferable resin layer, the kind of the solvent, and the drying temperature.

An example of a preferable manufacturing method for providing the predetermined ridge structure to the acrylic base material-resin layer interface in the optical laminate of the present invention includes:

(First Step)
the ionizing radiation-curable resin composition A including the difunctional di(meth)acrylate such as polyalkylene glycol di(meth)acrylate as a main component and the solvent is applied to the acrylic base material;

(Second Step)
the acrylic base material is swollen by the solvent, the monomer, and the like in the ionizing radiation-curable resin composition A;

(Third Step)
the acrylic base material swells while the solvent is dried at an appropriate drying temperature and the material component of the acrylic base material and the component of the ionizing radiation-curable resin composition A migrate to each other, whereby an optimal ridge having a crest and trough shape is formed along an acrylic base material-resin layer interface; and (Fourth Step)
the ionizing radiation-curable resin composition A is irradiated with ionizing radiation so as to be cured, thereby forming the resin layer, but the method for manufacturing the optical laminate is not limited thereto as long as the predetermined ridge is produced.

In a case in which other functional components such as a refractive index-adjusting material or an antistatic material are added to the resin layer, it is possible to make the functional components eccentrically present in the upper portion of the resin layer by the reverse flow of the material component of the acrylic base material and the respective functional components densely gather on the surface of the optical laminate and thus it is possible to favorably generate intended functions (antistatic properties, high refractive index, a low refractive index, and the like), which is preferable.

The ionizing radiation-curable resin composition A may further include a solvent drying-type resin. The joint use of the solvent drying-type resin enables the effective prevention of coating defects on the coating surface. Meanwhile, the solvent drying-type resin refers to a resin that turns into a coat simply by drying a solvent that is added to adjust the solid content during coating such as a thermoplastic resin.

There is no particular limitation regarding the solvent drying-type resin and, generally, a thermoplastic resin can be used.

There is no particular limitation regarding the thermoplastic resin and examples thereof include styrene-based resins, (meth)acrylate-based reins, vinyl acetate-based resins, vinyl ether-based resins, halogen-containing resins, alicyclic olefin-based resins, polycarbonate-based resins, polyester-based resins, polyamide-based resins, cellulose derivatives, silicone-based reins, rubber, elastomers, and the like. The thermoplastic resin is preferably amorphous and soluble in organic solvents (particularly, a common solvent capable of dissolving a plurality of polymers or curable compounds). Particularly, styrene-based resins, (meth)acrylate-based resins, alicyclic olefin-based resins, polyester-based resins, cellulose derivatives (cellulose esters and the like), and the like are preferred from the viewpoint of film-producing properties, transparency, or weather resistance.

There is no particular limitation regarding the initiator and a well-known initiator can be used. Specific examples of a photopolymerizable initiator include acetophenones, benzophenones, Michler's benzoyl benzoate, α-amyloxim ester, thioxanthones, propiophenones, benzyls, benzoins, and acylphosphine oxides. In addition, a photosensitizer is preferably mixed in and specific examples thereof include n-butylamine, triethylamine, poly-n-butylphosphine, and the like.

As the photopolymerizable initiator, in a case in which the photopolymerizable monomer/oligomer/polymer is a resin-based monomer/oligomer/polymer having a radical polymerizable unsaturated group, acetophenone, benzophenone, benzoin, benzoin methyl ether, or the like is preferably used singly or as a component of a mixture and 1-hydroxy-cyclohexyl-phenyl-ketone is particularly preferred due to the compatibility with an ionizing radiation-curable resin and a little chance of yellow discoloration. In addition, in a case in which the photopolymerizable monomer/oligomer/polymer has a cation polymerizable functional group, as the photopolymerizable initiator, an aromatic diazonium salt, an aromatic sulfonium salt, an aromatic iodonium salt, a metallocene compound, a benzoine sulfonate ester, or the like is preferably used singly or as a component of a mixture.

The content of the initiator in the ultraviolet-curable resin composition is preferably in a range of 1 part by mass to 10 parts by mass with respect to 100 parts by mass of a total amount of the photopolymerizable monomer, the photopolymerizable oligomer, and the photopolymerizable polymer. The content of the initiator being 1 part by mass or more is preferable from the viewpoint of the hardness of the resin layer in the optical laminate and, when the content is 10 parts by mass or less, resin deterioration caused by the excessive remaining of the initiator is suppressed, an increase in the cost can be prevented, and pencil hardness can be obtained on the surface of the intended resin layer or a hard coat layer described below.

A more preferable lower limit of the content of the initiator is 2 parts by mass and a more preferable upper limit is 8 parts by mass with respect to 100 parts by mass of a total amount of the photopolymerizable monomer, the photopolymerizable oligomer, and the photopolymerizable polymer. When the content of the initiator is within the above-described range, the resin composition is more reliably cured.

When the functional components are added to the ionizing radiation-curable resin composition A, it is possible to further impart functions to the resin layer.

Examples of the functional components include components that are used for ordinary optical sheets such as an antistatic agent, a refractive index adjuster, an antifouling agent, a slipping agent, an anti-glare agent, and a hard coat property-imparting agent.

The ionizing radiation-curable resin composition A may include an antistatic agent.

The antistatic agent is preferably an organic antistatic agent and more specific examples thereof include ionic antistatic agents such as lithium ion salts, quaternary ammonium salts, and ionic liquids and electron conductive antistatic agents such as polythiophene, polyaniline, polypyrrole, and polyacetylene.

Furthermore, the ionizing radiation-curable resin composition A may also include an antifouling agent such as fluorine or silicones.

In a case in which the functional components are used, the content thereof is preferably in a range of 1% by mass to 30% by mass with respect to the total mass of the solid content in the ionizing radiation-curable resin composition A.

Furthermore, in the optical laminate of the present invention, in a case in which the resin layer is formed using the ionizing radiation-curable resin composition A including the antistatic agent (that is, a case in which the resin layer includes the antistatic agent), when combined with the difunctional (meth)acrylate, the antistatic agent is eccentrically present on the top surface of the resin layer for the above-described reasons and thus the antistatic performance further improves. In addition, in a case in which the resin layer is formed using the ionizing radiation-curable resin composition A including ultrafine particles of silica, alumina, or the like as the hard coat property-imparting agent (that is, a case in which the resin layer includes the hard coat property-imparting agent), when combined with the polyalkylene glycol di(meth)acrylate, the hard coat property-imparting agent is eccentrically present on the top surface of the resin layer for the above-described reasons and thus the hard coat performance further improves.

There is no particular limitation regarding the method for preparing the ionizing radiation-curable resin composition A as long as the respective components are uniformly mixed together and the ionizing radiation-curable resin composition can be prepared using, for example, a well-known device such as a paint shaker, a beads mill, a kneader, or a mixer.

In addition, there is no particular limitation regarding the method for applying the ionizing radiation-curable resin composition A onto the acrylic base material and examples thereof include a spin coating method, a dipping method, a spraying method, a die coating method, a bar coating method, a gravure coating method, a roll coater method, a meniscus coater method, a flexography method, a screen printing method, a bead coater method.

A coated film formed by applying the ionizing radiation-curable resin composition A on the acrylic base material is preferably heated and/or dried as necessary and is cured through the radiation of an active energy ray or the like.

The drying time in the drying step is preferably in a range of 20 seconds to 2 minutes and more preferably in a range of 30 seconds to 1 minute. In addition, the drying temperature in the drying step is preferably in a range of 40° C. to 90° C. and more preferably in a range of 50° C. to 80° C. When the drying temperature exceeds 100° C., in spite of the selection of a solvent having preferable acryl-swelling properties, there are cases in which the infiltrating force of the solvent or the like becomes stronger and the base material is broken and thus the drying temperature is, basically, preferably 90° C. or lower regardless of solvents being used. For example, while methyl isobutyl ketone is a preferable solvent, when the drying temperature is 100° C., there are cases in which the acrylic base material is broken in a case in which tension is applied in spite of methyl isobutyl ketone.

The lowest temperature is preferably 50° C. or higher as long as the solvent can be dried. For example, in a case in which the methyl isobutyl ketone is used and the drying temperature is 30° C., the coated film is cured using an ultraviolet ray or the like while remaining insufficiently dried, in this case, the film is not favorably cured, and uncured portions are also generated. In this case, there are cases in which adhesiveness degrades.

Examples of the radiation of an active energy ray include the radiation of an ultraviolet ray or an electron beam.

Specific examples of an ultraviolet ray source in the radiation of an ultraviolet ray include light sources such as an ultrahigh-pressure mercury lamp, a high-pressure mercury lamp, a low-pressure mercury lamp, a carbon arc lamp, a black light fluorescent lamp, and a metal halide lamp. In addition, regarding the wavelength of the ultraviolet ray, it is possible to use an ultraviolet ray having a wavelength in a range of 190 nm to 380 nm.

Specific examples of an electron beam source in the radiation of an electron beam include a variety of electron beam accelerators such as a Cockroft Walton-type accelerator, a Van de Graft-type accelerator, a resonance transformer-type accelerator, an insulating core transformer-type accelerator, a straight accelerator, a Dainamitoron-type accelerator, and a high frequency-type accelerator.

Meanwhile, the film thickness (during the curing) of the resin layer is preferably in a range of 0.5 µm to 100 µm and more preferably in a range of 0.8 µm to 20 µm. The film thickness is most preferably in a range of 3.5 µm to 13 µm since it is easier to form an optimal ridge having a crest and trough shape along the acrylic base material-resin layer interface and curl-preventing properties or crack-preventing properties are particularly excellent.

In addition, in order to improve adhesiveness, the film thickness of the resin layer is preferably in a range of 0.8 µm to less than 3 µm. The film thickness of the resin layer of 0.8 µm is also the minimum film thickness necessary to form an optimal ridge having a crest and trough shape. In a case in which the film thickness of the resin layer is in a range of 0.8 µm to less than 3 µm, the above-described vertical difference between the standard height and the standard depth is preferably in a range of 0.3 µm to 1.5 µm.

Meanwhile, the vertical difference is set to satisfy a relationship of the film thickness of the resin layer>the vertical difference regardless of the value of the film thickness of the resin layer.

The film thickness of the resin layer is the average value (µm) obtained by observing a cross-section using an electron microscope (SEM, TEM, or STEM) and measuring the thicknesses at 10 arbitrary points.

In addition, the optical laminate of the present invention may include one or more selected from a low refractive index layer, a hard coat layer, an antifouling layer, an anti-glare layer, an antistatic layer, and a high refractive index layer immediately on the resin layer.

<Hard Coat Layer>

The hard coat layer is preferably made of a cured substance of an ionizing radiation-curable resin composition B.

The hardness of the hard coat layer is preferably H or more and more preferably 2H or more in the pencil hardness test (with a load of 4.9 N) according to JIS K5600-5-4 (1999). In addition, the hard coat layer may include the functional components.

The detail of the ionizing radiation-curable resin composition B that forms the hard coat layer is the same as that of the ionizing radiation-curable resin composition A except for the fact that the difunctional (meth)acrylate is not used as an essential component.

In addition, the amount of the photopolymerizable monomer (particularly, the polyfunctional monomer) blended with the ionizing radiation-curable resin composition B is preferably in a range of 30% by mass to 100% by mass, more preferably in a range of 40% by mass to 90% by mass, and still more preferably in a range of 50% by mass to 80% by mass. At this time, the balance of the ionizing radiation-curable resin composition B is preferably set to either or both the photopolymerizable oligomer and the photopolymerizable monomer.

In addition, the method for forming the hard coat layer is the same as the method for forming the resin layer. Additional details of the hard coat layer are also the same as those of the resin layer.

In the present invention, the hard coat layer is preferably laminated on the resin layer. In order to provide the hardness to the optical laminate, it can be considered that the resin layer is set to have high hardness. However, in a case in which a high hardness of 2H or more is directly provided above the acrylic base material, that is, using a material having a polyfunctional reactive functional group for the resin layer, there is a defect that the acrylic base material is likely to break when a certain pressure is partially applied to the hard coat layer. Therefore, in the optical laminate of the present invention, the resin layer present between the hard coat layer and the acrylic base material has a buffering action without allowing impact on the hard coat layer to be directly transmitted to the acrylic base material, which is preferable. In addition, the hardness can also be improved with the lamination of the resin layer and the hard coat layer compared with the lamination of the hard coat layer alone.

However, in a case in which the hard coat layer and the like are laminated, a new interface is generated between the hard coat layer and the resin layer, that is, the proportion of portions that possibly cause an interference pattern increases. In this case, what is important is that the refractive index of a layer being laminated needs to be as close to that of a layer below the layer as possible. Therefore, in order to maintain the interference pattern favorable, the refractive index of the hard coat layer is preferably almost the same as the refractive index of the resin layer and a preferable refractive index difference is 0.03 or less.

The film thickness of the hard coat layer is preferably in a range of 1 µm to 20 µm and more preferably in a range of 3.5 µm to 13 µm.

<Low Refractive Index Layer>

The optical laminate of the present invention preferably further includes a low refractive index layer on the hard coat layer.

The low refractive index layer is preferably formed using a composition for forming the low refractive index including any of 1) a resin containing low refractive index inorganic fine particles such as silica or magnesium fluoride, 2) a fluorine-based resin which is a low refractive index resin, 3) a fluorine-based resin containing low refractive index inorganic fine particles such as silica or magnesium fluoride, and 4) a low refractive index inorganic thin film of silica, magnesium fluoride, or the like. As the resin other than the fluorine-based resin, the same resin as the above-described acrylic resin can be used.

In addition, the above-described silica is preferably hollow silica fine particles and the hollow silica fine particles can be produced using, for example, the manufacturing method described in the examples of JP-A-2005-099778.

The refractive index of the low refractive index layer is preferably 1.47 or less and particularly preferably 1.42 or less. In addition, the thickness of the low refractive index layer is not limited and, generally, may be appropriately set in a range of approximately 10 nm to 1 μm.

As the fluorine-based resin, a polymerizable compound including at least a fluorine atom in the molecule or a polymer thereof can be used. The polymerizable compound is not particularly limited, but is preferably, for example, a compound having a curing reactive group such as a functional group cured by ionizing radiation or a thermally curing polar group. In addition, a compound having the above-described reactive groups at the same time may be used. Compared with the polymerizable compound, the polymer does not include any reactive group and the like described above.

As the polymerizable compound having the functional group cured by ionizing radiation, it is possible to widely use a fluorine-containing monomer having an ethylenic unsaturated bond. More specific examples thereof include fluoroolefins (for example, fluoroethylene, vinylidene fluoride, tetrafluoroethylene, hexafluoropropylene, perfluorobutadiene, perfluoro-2,2-dimethyl-1,3-dioxole, and the like). Examples of the polymerizable compound having a (meth)acryloyloxy group include (meth)acrylate compounds having a fluorine atom in the molecule such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, methyl α-trifluoromethacrylate, and ethyl α-trifluoromethacrylate; fluorine-containing polyfunctional (meth)acrylic acid ester compounds having a fluoroalkyl group, a fluorocycloalkyl group, or a fluoroalkylene group which has at least 3 fluorine atoms in the molecule and has 1 to 14 carbon atoms and at least 2 (meth)acryloyloxy group; and the like.

Preferable examples of the thermally curing polar group include hydrogen bond-forming groups such as a hydroxyl group, a carboxyl group, an amino group, and an epoxy group. These groups are excellent in terms of not only the adhesiveness to coated films but also the affinity to inorganic ultrafine particles of silica or the like. Examples of the polymerizable compound having a thermosetting polar group include 4-fluoroethylene-perfluoroalkyl vinyl ether copolymers; fluoroethylene-hydrocarbon-based vinyl ether copolymers; fluorine-denatured products of individual resins of epoxy, polyurethane, cellulose, phenol, polyimide, and the like.

Examples of the polymerizable compound having both the functional group cured by ionizing radiation and the thermally curing polar group include partially or fully-fluorinated alkyls, alkenyls, and aryl esters of acrylic acid or methacrylic acid, fully or partially fluorinated vinyl ethers, fully or partially fluorinated vinyl esters, fully or partially fluorinated vinyl ketones, and the like.

In addition, examples of the fluorine-based resin include the following resins.

Examples thereof include polymers of a monomer or a monomer mixture including at least one of the fluorine-containing (meth)acrylate compounds of the polymerizable compound having an ionizing radiation curable group; copolymers of at least one of the fluorine-containing (meth)acrylate compounds and a (meth)acrylate compound having no fluorine atom in the molecule such as methyl (meth)acrylate, ethyl (meth)acrylate, propyl (meth)acrylate, butyl (meth)acrylate, or 2-ethylhexyl (meth)acrylate; homopolymers or copolymers of a fluorine-containing monomer such as fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene; and the like. Silicone-containing vinylidene fluoride copolymers obtained by adding a silicone component to the above-described copolymer can also be used. Examples of the silicone component in this case include (poly)dimethylsiloxane, (poly) diethylsiloxane, (poly)diphenylsiloxane, (poly)methylphenylsiloxane, alkyl-denatured (poly)dimethylsiloxane, azo group-containing (poly)dimethylsiloxane, dimethylsilicone, phenylmethyl silicone, alkyl-denatured silicone, aralkyl-denatured silicone, fluorosilicone, polyether-denatured silicone, aliphatic acid ester-denatured silicone, methyl hydrogen silicone, silanol group-containing silicone, alkoxy group-containing silicone, phenol group-containing silicone, methacryl-denatured silicone, acryl-denatured silicone, amino-denatured silicone, carboxylic acid-denatured silicone, carbinol-denatured silicone, epoxy-denatured silicone, mercapto-denatured silicone, fluorine-denatured silicone, polyether-denatured silicone, and the like. Among them, fluorine-based reins having a dimethylsiloxane structure are preferred.

Furthermore, non-polymers or polymers made of a compound described below can also be used as the fluorine-based resin. That is, it is possible to use compounds obtained by reacting a fluorine-containing compound having at least one isocyanate group in the molecule and a compound having at least one functional group which reacts with the isocyanate group such as an amino group, a hydroxyl group, or a carboxyl group in the molecule; compounds obtained by reacting a fluorine-containing polyol such as fluorine-containing polyether polyol, fluorine-containing alkylpolyol, fluorine-containing polyester polyol, or fluorine-containing ε-caprolactone-denatured polyol and a compound having an isocyanate group, and the like.

In addition, the composition for forming the low refractive index layer may include the respective thermoplastic resins described above together with the polymerizable compound or polymer having a fluorine atom. Furthermore, it is possible to appropriately use a curing agent for curing the reactive groups and the like and use a variety of additives and solvents in order to improve coatability or impart antifouling properties.

In the formation of the low refractive index layer, the viscosity of the composition for forming the low refractive index layer is set in a range of 0.5 mPa·s to 5 mPa·s (25° C.) and preferably set in a range of 0.7 mPa·s to 3 mPa·s (25° C.) with which preferable coatability can be obtained. An excellent visible light antireflection layer can be realized, a uniform and evenly-coated thin film can be formed, and a low refractive index layer having particularly excellent adhesiveness can be formed.

Means for curing the resin may be the same as means for curing the hard coat layer. In a case in which heating means is used in order for curing management, it is preferable that, for example, a radical is generated by heating and thus a thermopolymerization initiator that initiates the polymerization of the polymerizable compound is added to the composition for forming the low refractive index layer.

In the optical laminate of the present invention, the total light transmittance is preferably 80% or more. When the total light transmittance is less than 80%, in a case in which the optical laminate is mounted in an image display apparatus, there is a concern that color reproducibility or visibility may be impaired and there is another concern that a desired contrast cannot be obtained. The total light transmittance is more preferably 90% or more.

The total light transmittance can be measured using a haze meter (manufactured by Murakami Color Research Laboratory Co., Ltd., product No.; HM-150) and the method according to JIS K-7361.

In addition, in the optical laminate of the present invention, the haze is preferably 1% or less. When the haze is 1% or less, desired optical characteristics are obtained and visibility does not deteriorate when the optical laminate of the present invention is installed on an image display surface. The haze is more preferably 0.8% or less and still more preferably 0.5% or less.

The haze can be measured using a haze meter (manufactured by Murakami Color Research Laboratory Co., Ltd., product No.; HM-150) and the method according to JIS K-7136.

A polarization plate of the present invention is formed by laminating the optical laminate of the present invention on at least one surface of a polarization film.

The polarization film is not particularly limited and, for example, a polyvinyl alcohol film, a polyvinyl formal film, a polyvinyl acetal film, an ethylene-vinyl acetate copolymer-based saponified film, or the like, which is dyed with iodine or the like and is stretched, can be used. In the lamination treatment of the polarization film and the optical laminate, it is preferable to carry out a saponification treatment on the acrylic base material. The saponification treatment improves adhesiveness and can also provide an antistatic effect.

The present invention provides an image display apparatus including the optical laminate and/or the polarization plate.

Examples of the image display apparatus include televisions, computers, LCDs, PDPs, FEDs, ELDs (organic ELs and inorganic ELs), CRTs, tablet PCs, electronic paper, mobile phones, and the like. Furthermore, the image display apparatus can also be preferably used as touch panels used in the image display apparatus and the like.

An LCD which is a typical example described above includes a permeable display body and a light source device that radiates light to the permeable display body from the rear surface. In a case in which the image display apparatus of the present invention is an LCD, the image display apparatus is produced by forming the optical laminate of the present invention and/or the polarization plate of the present invention on the front surface of the permeable display body. However, in the case of an image display apparatus having a touch panel mounted therein, the optical laminate and the polarization plate can also be used as a transparent substrate constituting the touch panel as well as on the front surface.

An LCD which is a typical example described above includes a permeable display body and a light source device that radiates light to the permeable display body from the rear surface. In a case in which the image display apparatus of the present invention is an LCD, the image display apparatus is produced by forming the optical laminate of the present invention and/or the polarization plate of the present invention on the front surface of the permeable display body. In addition, in the case of an image display apparatus having a touch panel mounted therein or even an LCD, depending on cases, the optical laminate and the polarization plate can also be used as a transparent substrate constituting the inside of the apparatus as well as on the front surface.

In a liquid crystal display apparatus of the present invention, a light source in a light source device radiates light from the bottom of the optical laminate or the polarization plate. Meanwhile, a phase difference plate may be inserted between the liquid crystal display apparatus and the polarization plate. Adhesive layers may be provided as necessary between the respective layers in the liquid crystal display apparatus.

Here, in a case in which the present invention is a liquid crystal display apparatus including the optical laminate, in the liquid crystal display apparatus, there is no particular limitation regarding a backlight source, but a white light-emitting diode (white LED) is preferred and the image display apparatus of the present invention is preferably a VA-mode or IPS-mode liquid crystal display apparatus including a white light-emitting diode as the backlight source.

The white LED is a fluorescent body-type element, that is, which is made to emit white light by combining a light-emitting diode for which a compound semiconductor is used and which emits blue light or ultraviolet light and a fluorescent body. Among them, a white light-emitting diode made of a light-emitting element obtained by combining a blue light-emitting diode for which a compound semiconductor is used and an yttrium.aluminum.garnet-based yellow fluorescent body has a continuous and wide light-emitting spectrum and thus is effective for the improvement of antireflection performance and bright place contrast and also has an excellent light-emitting efficiency and thus is preferable as the backlight source in the present invention. In addition, it becomes possible to widely use a white LED having small power consumption and thus it becomes possible to exhibit an energy-saving effect.

In addition, the vertical alignment (VA) mode refers to an operation mode in which, when no voltage is applied, liquid crystal molecules are oriented so as to be perpendicular to the substrate of a liquid crystal cell and thus the screen displays dark and, when voltage is applied, liquid crystal molecules collapse and thus the screen displays bright.

In addition, the in-plane switching (IPS) mode refers to a method in which a liquid crystal is rotated in a substrate surface using a lateral-direction electric field applied to a comb-shaped electrode pair provided on one substrate of the liquid crystal cell and thus display is carried out.

A PDP which is the image display apparatus is an apparatus including a front surface glass substrate having an electrode formed on the front surface and a rear surface glass substrate which is disposed opposite to the front surface glass substrate with a discharge gas sealed between the glass substrates, includes an electrode and fine grooves formed on the front surface, and includes red, green, and blue fluorescent body layers formed in the grooves. In a case in which the image display apparatus of the present invention is a PDP, the image display apparatus includes the above-described optical laminates on the front surface of the front surface glass substrate or a front surface plate (a glass substrate or a film substrate).

The image display apparatus may be an image display apparatus such as an ELD apparatus in which zinc sulfide which emits light when voltage is applied, a diamine substance: a light-emitting body is deposited on a glass substrate and the voltage applied to the substrate is controlled, thereby carrying out display or a CRT in which an electrical signal is converted to light and an image visible to human eyes is generated. In this case, the above-described display apparatuses include the above-described optical laminate on the outermost surface or on the front surface of the front surface plate.

EXAMPLES

Next, the present invention will be described in more detail using examples. The present invention is no by means limited to the examples.

Example 1

Manufacturing of Acrylic Base Material

A pellet made of a copolymer (glass transition temperature: 130° C.) of methyl methacrylate and methyl acrylate was melt-kneaded and a polymer was extruded from an aperture in a die using a melt-extrusion method while the pellet was made to pass through a filter so as to remove foreign substances. Next, while being cooled, the polymer was stretched 1.2 times in the vertical direction and then was stretched 1.5 times in the horizontal direction, thereby obtaining a 40 µm-thick acrylic base material.

(Preparation of Composition for Forming Resin Layer)

Tetraethylene glycol diacrylate (100 parts by mass, manufactured by Toagosei Co., Ltd., "M240") and an initiator (4 parts by mass, manufactured by BASF, "Irg184") were dissolved in methyl isobutyl ketone (150 parts by mass), thereby preparing a composition for forming the resin layer.

Furthermore, Table 1 describes the formulation of the composition for forming the resin layer.

(Preparation of Composition for Forming Hard Coat Layer 1)

Dipentaerythritol hexaacrylate (50 parts by mass, manufactured by Nippon Kayaku Co., Ltd.), urethane acrylate (50 parts by mass, manufactured by The Nippon Synthetic Chemical Industry Co. Ltd., "UV1700B", decafuctional, weight-average molecular weight: 2,000), and an initiator (4 parts by mass, manufactured by BASF, "Irg184") were dissolved in methyl isobutyl ketone (150 parts by mass), thereby preparing a composition for forming the hard coat layer 1.

(Manufacturing of Optical Laminate)

The composition for forming the resin layer was applied to an acrylic base material using a die coating method, was dried at 70° C. for 1 minute so as to evaporate the solvent, thereby forming a resin layer so that the coating amount after the drying reached 4 g/m$^2$ (dried film thickness: 3.5 µm). The obtained coated film was irradiated with an ultraviolet ray at a radiation intensity of 70 mJ/cm$^2$ so as to half cure the coated film (a half-cured state).

Next, the composition for forming the hard coat layer 1 was applied onto the resin layer formed as described above using a die coating method, was dried at 70° C. for 1 minute so as to evaporate the solvent, thereby forming a hard coat layer 1 so that the coating amount after the drying reached 8 g/m$^2$ (dried film thickness: 7 µm). The obtained coated film was irradiated with an ultraviolet ray at an ultraviolet ray radiation intensity of 200 mJ/cm$^2$ so as to fully cure the coated film (a full-cured state), thereby obtaining an optical laminate.

Examples 2 to 16 and Comparative Examples 1 to 10

Optical laminates were obtained in the same manner as in Example 1 except for the fact that the formulation of the composition for forming the resin layer was changed to the formulations described in Table 1.

Example 17

An optical laminate was obtained in the same manner as in Example 1 except for the fact that a composition for forming the hard coat layer 2 prepared as described below was used as the composition for forming the hard coat layer instead of the composition for forming the hard coat layer 1.

(Preparation of Composition for Forming Hard Coat Layer 2)

Dipentaerythritol hexaacrylate (30 parts by mass, manufactured by Nippon Kayaku Co., Ltd.), urethane acrylate (46 parts by mass, manufactured by Arakawa Chemical Industries, Ltd., "BS577", hexafuctional, weight-average molecular weight: 1,000), a monomer (20 parts by mass, manufactured by Toagosei Co., Ltd., "M315", trifunctional), a quaternary ammonium salt-containing oligomer (4 parts by mass, manufactured by Taisei Fine Chemical Co., Ltd., "1SX3000"), and an initiator (4 parts by mass, manufactured by BASF, "Irg184") were dissolved in methyl isobutyl ketone (130 parts by mass) and N-butanol (20 parts by mass), thereby preparing a composition for forming the hard coat layer 2.

The optical laminate obtained in Example 17 included an antistatic agent in the hard coat layer and thus had antistatic properties.

For the optical laminates obtained in Examples 1 to and Comparative Examples 1 to 10, the following evaluations were carried out. The results are described in Table 1.

(Length of Ridge Corresponding to Standard Length of 30 µm)

A cross-section of the obtained optical laminate in the thickness direction was photographed using a scanning transmission electron microscope (STEM) and the length of the ridge was measured from an image on the basis of the above-described "method for manufacturing the length of the ridge corresponding to the standard length of 30 µm".

(Vertical Difference Between Standard Height and Standard Depth)

As illustrated in FIG. 4, in the cross-section of the optical laminate in the thickness direction, the acrylic base material-resin layer interface exhibited a ridge having crests and troughs, in an xy plane having an y axis in the thickness direction of the optical laminate (here, the positive orientation was toward the resin layer) and an x axis in a direction perpendicular to the y axis, the standard length L of 30 wrt was set in the x axis direction, 3 smallest points (4b-1) in terms of the y coordination were selected from plural infinitesimal points 4b of the ridge in the standard length L, the average y coordinate thereof was considered as the standard depth 5b, on the other hand, 3 largest points (4a-1) in terms of the y coordination were selected from plural maximal points 4a of the ridge in the standard length L, the average y coordinate thereof was considered as the standard height 5a, and the difference (absolute value) between the standard depth 5b and the standard height 5a served as the vertical difference between the standard depth 5b and the standard height 5a.

(Average Inclination Angle θa)

As illustrated in FIG. 5, in the cross-section of the optical laminate in the thickness direction, the acrylic base material-resin layer interface exhibited a ridge having crests and troughs, in an xy plane having an y axis in the thickness direction of the optical laminate (here, the positive orientation was toward the resin layer) and an x axis in a direction perpendicular to the y axis, the standard length L of 30 μm was set in the x axis direction, extremal points (maximal points 4a and infinitesimal points 4b) of the ridge in the standard length L were determined, and, when the sum of the vertical differences ($h_1$ to $h_{12}$, absolute values) between all of the adjacent extremal points was considered as the total vertical difference ΣH, the value expressed by $\tan^{-1}$ (total vertical difference ΣH/standard length L) served as the average inclination angle θa.

(Average Interval Sm of Protrusions and Recesses)

The average interval Sm of the protrusions and the recesses was measured according to JIS B0601 (1994).

(Adhesiveness)

On the basis of JIS K 5600, 1 mm×1 mm cells was drawn on the hard coat layer in the optical laminate so that sum of the cells running 100, a peeling test was continuously carried out 5 times using a 24 mm CELLOTAPE (registered trademark) manufactured by Nichiban Co., Ltd., and the number of remaining cells was counted.

The adhesiveness was evaluated as described below on the basis of the number of cells that were not peeled off. Optical laminates evaluated to be 0 level or higher can become favorable products.

A: 90 to 100
B: 80 to 89
C: 50 to 79
D: less than 50

(Interference Pattern)

After black tape was attached to a surface opposite to the hard coat layer in the optical laminate, the presence of an interference pattern was visually evaluated under a three-wavelength tube fluorescent lamp. In a case in which no interference pattern could be observed, the optical laminate was evaluated to be A, in a case in which an interference pattern could be vaguely observed, the optical laminate was evaluated to be B, and, in a case in which an interference pattern could be observed, the optical laminate was evaluated to be C.

(Manufacturing Processability)

In a stage in which the composition for forming the resin layer was applied and dried on the acrylic base material, a tension test was carried out. The degree of tension was set to 2.2 N/cm.

As a result, in a case in which the optical laminate was tensioned but was not fractured, the optical laminate was valuated to be "favorable" and, in a case in which the optical laminate was slightly fractured and a problem was caused in terms of manufacturing processability, the optical laminate was evaluated to be "poor".

In the optical laminate evaluated to be "poor" in terms of the manufacturing processsbility, the properties of the base material are weak and thus the pencil hardness (JIS K5600-5-4) cannot reach 2H or more even when the resin layer, the hard coat layer, and the like are cured.

(Haze)

The haze value (%) of the optical laminate was measured using a haze meter (manufactured by Murakami Color Research Laboratory Co., Ltd., product No.; HM-150) according to JIS K-7136 and was evaluated on the basis of the following evaluation standards.

A: The haze value was 0.8 or less
B: The haze value was more than 0.8

(Surface Resistance)

For the respective optical laminates produced in the examples and the comparative examples, the surface resistance values were measured using a surface resistance measurement instrument (HIRESTA HT-210, manufactured by Mitsubishi Chemical Corporation).

TABLE 1

| | | Examples | | | | | | | |
|---|---|---|---|---|---|---|---|---|---|
| | | 1 | 2 | 3 | 4 | 5 | 6 | 7 | 8 |
| Composition for forming resin layer (parts by mass) | PEG di(meth)acrylate 1 | 100 | | 50 | | 80 | 80 | 80 | 80 |
| | PEG di(meth)acrylate 2 | | 100 | 50 | | | | | |
| | PEG di(meth)acrylate 3 | | | | 70 | | | | |
| | Maleimide polymer | | | | | | | | |
| | PETA | | | | | | | | |
| | Polyfunctional polymer | | | | | 20 | | | |
| | Polyfunctional oligomer | | | | | | 20 | | |
| | Monomer 1 | | | | 20 | | | 20 | |
| | Monomer 2 | | | | 10 | | | | 20 |
| | Quaternary ammonium salt | | | | | | | | |
| | Initiator | 4 | 4 | 4 | 4 | 4 | 4 | 4 | 4 |
| Particles | ATO particles | | | | | | | | |
| | Reactive silica | | | | | | | | |
| | Zirconia | | | | | | | | |
| Solvent | MIBK | 150 | 150 | 150 | 150 | 150 | 150 | 150 | 150 |
| | PGME | | | | | | | | |
| | 1-butanol | | | | | | | | |
| | MEK | | | | | | | | |
| Length of ridge (μm) (standard length: 30 μm) | | 37 | 35 | 37 | 36 | 36 | 37 | 34 | 34 |
| Vertical difference between standard height and standard depth (μm) | | 1.86 | 1.75 | 1.81 | 1.79 | 1.79 | 1.79 | 1.32 | 1.32 |
| Average inclination angle θa (°) of ridge | | 30.7 | 25.3 | 27.4 | 29.5 | 30.1 | 30.1 | 25.7 | 25.7 |
| Average interval Sm of protrusions and recesses shown by ridge (μm) | | 2.3 | 2.3 | 2.4 | 2.5 | 2.3 | 2.3 | 2.7 | 2.8 |
| Evaluation | Adhesiveness | A | A | A | A | A | A | A | A |
| | Interference pattern | A | A | A | A | A | A | A | A |

TABLE 1-continued

|  |  |  |  |  |  |  |  |  |
|---|---|---|---|---|---|---|---|---|
| Manufacturing processability | Favorable | Favorable | Favorable | Favorable | Favorable | Favorable | Favorable | Favorable |
| Haze | A | A | A | A | A | A | A | A |
| Surface resistance (Ω/□) | ND | ND | ND | ND | ND | ND | ND | ND |

| | | Examples | | | | | | | | |
|---|---|---|---|---|---|---|---|---|---|---|
| | | 9 | 10 | 11 | 12 | 13 | 14 | 15 | 16 | 17 |
| Composition for forming resin layer (parts by mass) | PEG di(meth)acrylate 1 | 80 | 55 | 80 | 95 | 100 | 100 | 100 | 80 | 60 |
| | PEG di(meth)acrylate 2 | | | | | | | | | |
| | PEG di(meth)acrylate 3 | | | | | | | | | |
| | Maleimide polymer | | | | | | | | 10 | |
| | PETA | | | | | | | | 10 | |
| | Polyfunctional polymer | | | | | | | | | |
| | Polyfunctional oligomer | | | | | | | | | |
| | Monomer 1 | | 15 | | | | | | | 20 |
| | Monomer 2 | | 10 | | | | | | | 20 |
| | Quaternary ammonium salt | | | | 5 | | | | | |
| | Initiator | 4 | 4 | 4 | 4 | 4 | 4 | 4 | 4 | 4 |
| Particles | ATO particles | 20 | | | | | | | | |
| | Reactive silica | | 20 | | | | | | | |
| | Zirconia | | | 20 | | | | | | |
| Solvent | MIBK | 150 | 150 | 150 | 150 | | | 100 | 150 | 150 |
| | PGME | | | | | 150 | | | | |
| | 1-butanol | | | | | | 150 | 50 | | |
| | MEK | | | | | | | | | |
| Length of ridge (μm) (standard length: 30 μm) | | 34 | 32 | 34 | 34 | 39 | 38 | 41 | 35 | 36 |
| Vertical difference between standard height and standard depth (μm) | | 1.32 | 0.30 | 1.42 | 1.42 | 2.50 | 2.01 | 3.35 | 1.67 | 1.83 |
| Average inclination angle θa (°) of ridge | | 25.7 | 25.7 | 25.6 | 25.6 | 42.1 | 36.5 | 47.0 | 29.1 | 30 |
| Average interval Sm of protrusions and recesses shown by ridge (μm) | | 2.6 | 2.6 | 2.6 | 2.6 | 2.3 | 2.2 | 1.9 | 2.5 | 2.5 |
| Evaluation | Adhesiveness | A | B | A | A | A | A | A | A | B |
| | Interference pattern | A | A | A | A | A | A | A | A | A |
| | Manufacturing processability | Favorable | Favorable | Favorable | Favorable | Favorable | Favorable | Favorable | Favorable | Favorable |
| | Haze | A | A | A | A | A | A | A | A | A |
| | Surface resistance (Ω/□) | $1.0 \times 10^{10}$ | ND | ND | $1.0 \times 10^{10}$ | ND | ND | ND | ND | ND |

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Composition for forming resin layer (parts by mass) | PEG di(meth)acrylate 1 | | | | | | | | | 40 | 100 |
| | PEG di(meth)acrylate 2 | | | | | | | | | | |
| | PEG di(meth)acrylate 3 | | | | | | | | | | |
| | Maleimide polymer | 100 | | | | | | | | | |
| | PETA | | 100 | 100 | | | | | 100 | 40 | 95 |
| | Polyfunctional polymer | | | | 100 | | | | | | |
| | Polyfunctional oligomer | | | | | 100 | | | | | |
| | Monomer 1 | | | | | | 100 | | | | |
| | Monomer 2 | | | | | | | | | | |
| | Quaternary ammonium salt | | | | | | | | | | 5 |
| | Initiator | 4 | 4 | 4 | 4 | 4 | 4 | 4 | 4 | 4 | 4 |
| Particles | ATO particles | | | | | | | | | | |
| | Reactive silica | | | | | | | | 20 | | |
| | Zirconia | | | | | | | | | | |
| Solvent | MIBK | 150 | 150 | 250 | 150 | 150 | 150 | 100 | 150 | 150 | |
| | PGME | | | | | | | | | | |
| | 1-butanol | | | | | | | | | | |
| | MEK | | | | | | | 50 | | | 350 |
| Length of ridge (μm) (standard length: 30 μm) | | 30.1 | 30.3 | 30.2 | 30.1 | 30.1 | 30.5 | 30.5 | 30.3 | 30.2 | 50 |
| Vertical difference between standard height and standard depth (μm) | | 0.01 | 0.2 | 1.45 | 0.01 | 0.01 | 0.7 | 0.7 | 0.23 | 0.2 | 4.50 |
| Average inclination angle θa (°) of ridge | | 0.11 | 0.15 | 12.0 | 0.11 | 0.11 | 12.7 | 10.3 | 12.7 | 0.11 | 70.0 |

TABLE 1-continued

| | | | | | | | | | | |
|---|---|---|---|---|---|---|---|---|---|---|
| Average interval Sm of protrusions and recesses shown by ridge (μm) | | 8.0 | 8.3 | 8.0 | 9.0 | 9.0 | 5.8 | 5.7 | 6.3 | 6.0 | 1.5 |
| Evaluation | Adhesiveness | B | D | C | D | D | D | D | D | D | B |
| | Interference pattern | C | C | B | C | C | C | C | B | C | A |
| | Manufacturing processability | Favorable | Favorable | Favorable | Favorable | Favorable | Favorable | Poor | Favorable | Favorable | Poor |
| | Haze | A | A | A | A | A | A | A | A | A | C |
| | Surface resistance (Ω/□) | ND | ND | ND | ND | ND | ND | ND | ND | $1.0 \times 10^{13}$ | ND |

ND: not detected
PEG di(meth)acrylate 1: tetraethylene glycol diacrylate (manufactured by Toagosei Co., Ltd., "M240", molecular weight: 286)
PEG di(meth)acrylate 2: triethylene glycol dimethacrylate (manufactured by Kyoeisha Chemical Co., Ltd., "LIGHT ESTERS 3EG", molecular weight: 270)
PEG di(meth)acrylate 3: tetraethylene glycol dimethacrylate (manufactured by Kyoeisha Chemical Co., Ltd., "LIGHT ESTERS 4EG", molecular weight: 314)
Maleimide polymer: (manufactured by Toagosei Co., Ltd., "UVT302")
PETA: Pentaerythritol triacrylate
Polyfunctional polymer: manufactured by Arakawa Chemical Industries, Ltd., "BS371"
Polyfunctional oligomer: manufactured by Dai-ichi Kogyo Seiyaku Co., Ltd., "R1403"
Monomer 1: Dipentaerythritol hexaacrylate, manufactured by Nippon Kayaku Co., Ltd.
Monomer 2: Orthophenyl phenol EO-denatured acrylate, manufactured by Toagosei Co., Ltd., M106
Quaternary ammonium salt: manufactured by Colcoat Co., Ltd., "COLCOAT NR121X"
ATO particles: A methyl isobutyl ketone dispersion fluid of antimony-doped tin oxide, manufactured by Mitsubishi Materials Electronic Chemicals Co., Ltd., "EPT5DL2MIBK"
Reactive silica: manufactured by Nissan Chemical Industries, Ltd., "MIBKSD", average particle diameter: 12 nm
Zirconia: A MEK dispersion fluid of zirconium oxide (a dispersion fluid with a solid content of 30%, manufactured by Sakai Chemical Industry Co., Ltd., "SZR-K 4 nm")
MIBK: Methyl isobutyl ketone
PGME: Propylene glycol monomethyl ether
MEK: Methyl ethyl ketone

INDUSTRIAL APPLICABILITY

The optical laminate of the present invention can be preferably used for cathode-ray tube display devices (CRT), liquid crystal displays (LCD), plasma displays (PDP), electroluminescence displays (ELD), touch panels, electronic paper, displays in mobile phones and the like, and, particularly, high-definition displays.

REFERENCE SIGNS LIST

1 ACRYLIC BASE MATERIAL
2 RESIN LAYER
3 HARD COAT LAYER
4 ACRYLIC BASE MATERIAL-RESIN LAYER INTERFACE
4a MAXIMAL POINT
4a-1 MAXIMAL POINT HAVING LARGEST Y COORDINATE (3 POINTS)
4b INFINITESIMAL POINT
4b-1 INFINITESIMAL POINT HAVING SMALLEST Y COORDINATE (3 POINTS)
5a STANDARD DEPTH
5b STANDARD HEIGHT
h VERTICAL DIFFERENCE BETWEEN STANDARD HEIGHT AND STANDARD DEPTH
$h_1$ TO $h_{12}$ VERTICAL DIFFERENCE BETWEEN ADJACENT EXTERNAL POINTS

The invention claimed is:

1. An optical laminate comprising a resin layer on one surface of an acrylic base material,
wherein, in a cross-section of the optical laminate in a thickness direction, an interface between the acrylic base material and the resin layer exhibits a ridge having crests and troughs and a length of the ridge corresponding to a standard length of 30 μm set in a direction perpendicular to the thickness direction of the optical laminate is in a range of 31 μm to 45 μm.

2. The optical laminate according to claim 1,
wherein, in the cross-section of the optical laminate in the thickness direction, in the standard length of 30 μm set in the direction perpendicular to the thickness direction of the optical laminate, an average depth of three deepest troughs selected from plural troughs in the interface is considered as a standard depth, subsequently, an average height of three highest crests selected from plural crests in the interface is considered as a standard height, and a vertical difference between the standard height and the standard depth is in a range of 0.3 μm to 3.5 μm.

3. The optical laminate according to claim 2, wherein the vertical difference between the standard height and the standard depth is in a range of 0.3 μm to 2.5 μm.

4. The optical laminate according to claim 2,
wherein an average inclination angle θa of the ridge is in a range of 15° to 48°.

5. The optical laminate according to claim 2,
wherein an average interval Sm of protrusions and recesses shown by the ridge is in a range of 0.5 μm to 7 μm.

6. A polarization plate formed by laminating the optical laminate according to claim 2 on at least one surface of a polarization film.

7. An image display apparatus comprising the optical laminate according to claim 2.

8. The optical laminate according to claim 1,
wherein an average inclination angle θa of the ridge is in a range of 15° to 48°.

9. The optical laminate according to claim 8,
wherein an average interval Sm of protrusions and recesses shown by the ridge is in a range of 0.5 μm to 7 μm.

10. A polarization plate formed by laminating the optical laminate according to claim 8 on at least one surface of a polarization film.

11. An image display apparatus comprising the optical laminate according to claim 8.

12. The optical laminate according to claim 1,
wherein an average interval Sm of protrusions and recesses shown by the ridge is in a range of 0.5 μm to 7 μm.

13. A polarization plate formed by laminating the optical laminate according to claim 12 on at least one surface of a polarization film.

14. A polarization plate formed by laminating the optical laminate according to claim 1 on at least one surface of a polarization film.

15. An image display apparatus comprising the polarization plate according to claim 14.

16. An image display apparatus comprising the optical laminate according to claim 1.

17. The optical laminate according to claim 1, wherein the haze of the optical laminate is 0.5% or less.

18. The optical laminate according to claim 1, wherein the resin layer comprising a cured substance of an ionizing radiation-curable resin composition including a difunctional (meth)acrylate,
    wherein the amount of the difunctional (meth)acrylate blended in the ionizing radiation-curable resin composition is in a range of 80% by mass or more.

19. The optical laminate according to claim 1, further comprising one or more layers immediately on the resin layer selected from the group consisting of a low refractive index layer, a hard coat layer, an antifouling layer, an anti-glare layer, an antistatic layer and a high refractive index layer.

20. The optical laminate according to claim 1, wherein the resin layer comprises a cured substance of an ionizing radiation-curable resin composition including a difunctional (meth)acrylate,
    wherein the amount of the difunctional (meth)acrylate blended in the ionizing radiation-curable resin composition is in a range of 95% by mass or more.

\* \* \* \* \*